(12) United States Patent
Bhagavathy et al.

(10) Patent No.: US 9,602,814 B2
(45) Date of Patent: Mar. 21, 2017

(54) METHODS AND APPARATUS FOR SAMPLING-BASED SUPER RESOLUTION VIDEO ENCODING AND DECODING

(75) Inventors: Sitaram Bhagavathy, Plainsboro, NJ (US); Joan Llach, Cesson Sevigne (FR); Dong-Qing Zhang, Plainsboro, NJ (US)

(73) Assignee: THOMSON LICENSING, Issy-les Moulineaux (FR)

( * ) Notice: Subject to any disclaimer, the term of this patent is extended or adjusted under 35 U.S.C. 154(b) by 453 days.

(21) Appl. No.: 13/574,428

(22) PCT Filed: Jan. 20, 2011

(86) PCT No.: PCT/US2011/000107
§ 371 (c)(1),
(2), (4) Date: Jul. 20, 2012

(87) PCT Pub. No.: WO2011/090790
PCT Pub. Date: Jul. 28, 2011

(65) Prior Publication Data
US 2012/0294369 A1     Nov. 22, 2012

Related U.S. Application Data

(60) Provisional application No. 61/297,320, filed on Jan. 22, 2010.

(51) Int. Cl.
*H04N 7/12*          (2006.01)
*H04N 11/02*       (2006.01)
(Continued)

(52) U.S. Cl.
CPC . *H04N 19/00721* (2013.01); *H04N 19/00072* (2013.01); *H04N 19/00078* (2013.01);
(Continued)

(58) Field of Classification Search
CPC ............... H04N 7/26; H04N 7/46; H04N 7/32
See application file for complete search history.

(56) References Cited

U.S. PATENT DOCUMENTS

| 845,751 A | 3/1907 | Brenzinger |
|---|---|---|
| 5,446,806 A | 8/1995 | Ran et al. |

(Continued)

FOREIGN PATENT DOCUMENTS

| CN | 1128097 | 7/1996 |
|---|---|---|
| CN | 1276946 | 12/2000 |

(Continued)

OTHER PUBLICATIONS

Smolic, A. et al., "Improved Video Coding Using Long-Term Global Motion Compensation", Proceedings of SPIE, SPIE, USA, vol. 5308, No. 1, Jan. 22, 2004, pp. 343-354, XP008046986.

(Continued)

*Primary Examiner* — Dave Czekaj
*Assistant Examiner* — Nam Pham
(74) *Attorney, Agent, or Firm* — Brian S. Dorini; Ronald J. Kolczynski

(57) ABSTRACT

Methods and apparatus are provided for sampling-based super resolution video encoding and decoding. The encoding method receives high resolution pictures and generates low resolution pictures and metadata there from, the metadata for guiding post-decoding post-processing of the low resolution pictures and the metadata; and then encodes the low resolution pictures and the metadata using at least one encoder. The corresponding decoding method receives a bitstream and decodes low resolution pictures and metadata there from using a decoder; and then reconstructs high resolution pictures respectively corresponding to the low resolution pictures using the low resolution pictures and the metadata.

33 Claims, 16 Drawing Sheets

(51) Int. Cl.

| | | |
|---|---|---|
| H04N 11/04 | (2006.01) | |
| H04N 19/577 | (2014.01) | |
| H04N 19/51 | (2014.01) | |
| H04N 19/527 | (2014.01) | |
| H04N 19/119 | (2014.01) | |
| H04N 19/132 | (2014.01) | |
| H04N 19/12 | (2014.01) | |
| H04N 19/59 | (2014.01) | |
| H04N 19/137 | (2014.01) | |
| H04N 19/172 | (2014.01) | |
| H04N 19/20 | (2014.01) | |
| H04N 19/46 | (2014.01) | |
| H04N 19/33 | (2014.01) | |

(52) U.S. Cl.
CPC . *H04N 19/00127* (2013.01); *H04N 19/00145* (2013.01); *H04N 19/00266* (2013.01); *H04N 19/00387* (2013.01); *H04N 19/00436* (2013.01); *H04N 19/00545* (2013.01); *H04N 19/00593* (2013.01); *H04N 19/00715* (2013.01); *H04N 19/00745* (2013.01); *H04N 19/00757* (2013.01)

(56) References Cited

U.S. PATENT DOCUMENTS

| | | | |
|---|---|---|---|
| 5,537,155 | A | 7/1996 | O'Connell et al. |
| 5,557,684 | A | 9/1996 | Wang et al. |
| 5,754,236 | A | 5/1998 | Lee |
| 5,764,374 | A | 6/1998 | Seroussi et al. |
| 5,768,434 | A | 6/1998 | Ran |
| 5,784,491 | A | 7/1998 | Koga |
| 5,822,465 | A | 10/1998 | Normile et al. |
| 5,862,342 | A | 1/1999 | Winter et al. |
| 6,043,838 | A | 3/2000 | Chen |
| 6,173,089 | B1 | 1/2001 | Van Lerberghe |
| 6,278,446 | B1 | 8/2001 | Liou et al. |
| 6,397,166 | B1 | 5/2002 | Leung et al. |
| 6,526,183 | B1 | 2/2003 | Bonnet et al. |
| 6,795,578 | B1 | 9/2004 | Kotani et al. |
| 6,798,834 | B1 | 9/2004 | Murakami et al. |
| 7,386,049 | B2 | 6/2008 | Garrido et al. |
| 7,433,526 | B2 | 10/2008 | Apostolopoulos et al. |
| 7,447,337 | B2 | 11/2008 | Zhang et al. |
| 7,623,706 | B1 | 11/2009 | Maurer |
| 7,643,690 | B2 | 1/2010 | Suzuki et al. |
| 7,671,894 | B2 | 3/2010 | Yea et al. |
| 7,715,658 | B2 | 5/2010 | Cho et al. |
| 8,340,463 | B1 | 12/2012 | Cho et al. |
| 8,831,107 | B2 | 9/2014 | Zheng et al. |
| 9,031,130 | B2 | 5/2015 | Suzuki et al. |
| 2001/0055340 | A1* | 12/2001 | Kim et al. ............... 375/240.21 |
| 2002/0009230 | A1 | 1/2002 | Sun et al. |
| 2002/0036705 | A1 | 3/2002 | Lee et al. |
| 2002/0172434 | A1 | 11/2002 | Freeman et al. |
| 2003/0005258 | A1 | 1/2003 | Modha et al. |
| 2003/0021343 | A1 | 1/2003 | Trovato |
| 2003/0058943 | A1 | 3/2003 | Zakhor et al. |
| 2004/0001705 | A1 | 1/2004 | Soupliotis et al. |
| 2004/0017852 | A1 | 1/2004 | Garrido et al. |
| 2004/0170330 | A1 | 9/2004 | Fogg |
| 2004/0213345 | A1 | 10/2004 | Holcomb et al. |
| 2004/0218834 | A1 | 11/2004 | Bishop et al. |
| 2004/0258148 | A1 | 12/2004 | Kerbiriou et al. |
| 2005/0015259 | A1 | 1/2005 | Thumpudi et al. |
| 2005/0019000 | A1 | 1/2005 | Lim et al. |
| 2005/0225553 | A1 | 10/2005 | Chi |
| 2005/0243921 | A1 | 11/2005 | Au et al. |
| 2006/0013303 | A1 | 1/2006 | Nguyen et al. |
| 2006/0039617 | A1 | 2/2006 | Makai et al. |
| 2006/0088191 | A1 | 4/2006 | Zhang et al. |
| 2006/0126960 | A1 | 6/2006 | Zhou et al. |
| 2006/0239345 | A1 | 10/2006 | Taubman |
| 2006/0245502 | A1 | 11/2006 | Cheng et al. |
| 2006/0269149 | A1 | 11/2006 | Song |
| 2007/0014354 | A1 | 1/2007 | Murakami et al. |
| 2007/0041663 | A1 | 2/2007 | Cho et al. |
| 2007/0118376 | A1 | 5/2007 | Mukerjee |
| 2007/0223808 | A1 | 9/2007 | Kerr |
| 2007/0223825 | A1 | 9/2007 | Ye et al. |
| 2007/0248272 | A1 | 10/2007 | Sun et al. |
| 2008/0107346 | A1 | 5/2008 | Zhang et al. |
| 2008/0117975 | A1 | 5/2008 | Sasai et al. |
| 2008/0131000 | A1 | 6/2008 | Tsai et al. |
| 2008/0152243 | A1 | 6/2008 | Min et al. |
| 2008/0159401 | A1 | 7/2008 | Lee et al. |
| 2008/0172379 | A1 | 7/2008 | Uehara et al. |
| 2008/0187305 | A1 | 8/2008 | Raskar et al. |
| 2009/0002379 | A1 | 1/2009 | Baeza et al. |
| 2009/0003443 | A1 | 1/2009 | Guo et al. |
| 2009/0041367 | A1 | 2/2009 | Mansour |
| 2009/0080804 | A1 | 3/2009 | Hamada et al. |
| 2009/0097564 | A1 | 4/2009 | Chen et al. |
| 2009/0097756 | A1 | 4/2009 | Kato |
| 2009/0116759 | A1 | 5/2009 | Suzuki et al. |
| 2009/0175538 | A1 | 7/2009 | Bronstein et al. |
| 2009/0180538 | A1 | 7/2009 | Visharam et al. |
| 2009/0185747 | A1 | 7/2009 | Segall et al. |
| 2009/0196350 | A1 | 8/2009 | Xiong |
| 2009/0232215 | A1 | 9/2009 | Park et al. |
| 2009/0245587 | A1 | 10/2009 | Holcomb et al. |
| 2009/0252431 | A1 | 10/2009 | Lu et al. |
| 2009/0274377 | A1 | 11/2009 | Kweon et al. |
| 2010/0046845 | A1 | 2/2010 | Wedi et al. |
| 2010/0054338 | A1 | 3/2010 | Suzuki et al. |
| 2010/0074549 | A1 | 3/2010 | Zhang et al. |
| 2010/0091846 | A1 | 4/2010 | Suzuki et al. |
| 2010/0104184 | A1 | 4/2010 | Bronstein et al. |
| 2010/0150394 | A1 | 6/2010 | Bloom et al. |
| 2010/0196721 | A1 | 8/2010 | Ogawa |
| 2010/0208814 | A1 | 8/2010 | Xiong et al. |
| 2010/0272184 | A1 | 10/2010 | Fishbain et al. |
| 2011/0007800 | A1 | 1/2011 | Zheng et al. |
| 2011/0047163 | A1 | 2/2011 | Chechik et al. |
| 2011/0142330 | A1 | 6/2011 | Min et al. |
| 2011/0170615 | A1 | 7/2011 | Vo et al. |
| 2011/0210960 | A1 | 9/2011 | Touma et al. |
| 2011/0261886 | A1 | 10/2011 | Suzuki et al. |
| 2012/0106862 | A1 | 5/2012 | Sato |
| 2012/0155766 | A1 | 6/2012 | Zhang et al. |
| 2012/0201475 | A1 | 8/2012 | Carmel et al. |
| 2012/0320983 | A1 | 12/2012 | Zheng et al. |
| 2013/0163676 | A1 | 6/2013 | Zhang et al. |
| 2013/0163679 | A1 | 6/2013 | Zhang et al. |
| 2013/0170558 | A1 | 7/2013 | Zhang |
| 2013/0170746 | A1 | 7/2013 | Zhang et al. |
| 2014/0036054 | A1 | 2/2014 | Zouridakis |
| 2014/0056518 | A1 | 2/2014 | Yano et al. |

FOREIGN PATENT DOCUMENTS

| | | |
|---|---|---|
| CN | 1495636 | 5/2004 |
| CN | 1777287 A | 5/2006 |
| CN | 1863272 | 11/2006 |
| CN | 101048799 | 10/2007 |
| CN | 101389021 | 3/2009 |
| CN | 101459842 A | 6/2009 |
| CN | 101551903 | 10/2009 |
| CN | 101556690 | 10/2009 |
| EP | 1401211 | 3/2004 |
| EP | 1659532 | 5/2006 |
| FR | 2941581 | 7/2010 |
| JP | 3027670 | 2/1991 |
| JP | 7231444 | 8/1995 |
| JP | H7-222145 | 8/1995 |
| JP | 8502865 | 3/1996 |
| JP | H8-336134 | 12/1996 |
| JP | 2000-215318 | 8/2000 |
| JP | 2003018398 | 1/2003 |
| JP | 2004222218 | 8/2004 |
| JP | 2004266794 | 9/2004 |
| JP | 200520761 | 1/2005 |

(56) References Cited

FOREIGN PATENT DOCUMENTS

| JP | 2006203744 | 8/2006 |
|---|---|---|
| JP | 2006519533 | 8/2006 |
| JP | 2008148119 | 6/2008 |
| JP | 2008289005 | 11/2008 |
| JP | 200977189 | 4/2009 |
| JP | 2009239686 | 10/2009 |
| JP | 2009267710 | 11/2009 |
| JP | 2010514325 | 4/2010 |
| JP | 2011501542 | 1/2011 |
| JP | 2013528309 | 7/2013 |
| KR | 0169662 | 10/1998 |
| WO | WO9406099 | 3/1994 |
| WO | WO9819450 | 7/1998 |
| WO | WO03084238 | 10/2003 |
| WO | WO03102868 | 12/2003 |
| WO | WO2005043882 | 5/2005 |
| WO | WO2006025339 | 3/2006 |
| WO | WO2007111966 | 10/2007 |
| WO | WO2008066025 | 6/2008 |
| WO | WO2009052742 | 4/2009 |
| WO | WO2009087641 | 7/2009 |
| WO | WO2009091080 | 7/2009 |
| WO | WO2009094036 | 7/2009 |
| WO | WO2009157904 | 12/2009 |
| WO | WO2010033151 | 3/2010 |
| WO | WO2011090798 | 7/2011 |
| WO | WO2011154127 | 12/2011 |

OTHER PUBLICATIONS

Park, S.C. et al., "Super-Resolution Image Reconstruction: A Technical Overview", IEEE Signal Processing Magazine, IEEE Service Center, Piscataway, NJ, US, vol. 20, No. 3, May 1, 2003, pp. 21-36, XP011097476.
Segail, C. A. et al., "High-Resolution Images from Low-Resolution Compressed Video", IEEE Signal Processing Magazine, IEEE Service Center, Piscataway, NJ, US, vol. 20, No. 3, May 1, 2003, pp. 37-48, XP011097477.
Zhu, C. et al., "Video Coding With Spatio-Temporal Texture Synthesis", IEEE International Conference on Multimedia and Expo (ICME), 2007, University of Science and Technology of China, Hefei, 230027, China, Microsoft Research Asia, Beijing, 100080, China, pp. 112-115.
Zhu, C. et al., "Video Coding With Spatio-Temporal Texture Synthesis and Edge-Based Inpainting", IEEE International Conference on Multimedia and Expo (ICME), 2008, University of Science and Technology of China, Hefei, 230027, China, Microsoft Research Asia, Beijing, 100080, China, pp. 813-816.
Vo, D. T. et al., "Data Pruning-Based Compression Using High Order Edge-Directed Interpolation", Thomson Research Technical Report, submitted to the IEEE International Conference on Acoustics, Speech, and Signal Processing (ICASSP), 2009, Video Processing Laboratory, UC San Diego, CA 92092, Thomson Inc. Corporate Research, Princeton, NJ USA.
Ben-Ezra, M. et al., "Video Super-Resolution Using Controlled Subpixel Detector Shifts", IEEE Transactions on Pattern Analysis and Machine Intelligence, vol. 27, No. 6, Jun. 2005, pp. 977-987.
Ndjiki-Nya, P. et al., "A Generic and Automatic Content-Based Approach for Improved H.264/MPEG4-AVC Video Coding", IEEE International Conference on Image Processing (ICIP), 2005, Image Processing Department, FhG Heinrich-Hertz-Institut (HHI), Berlin, Germany.
Itu-T, H.264, "Series H: Audiovisual and Multimedia Systems, Infrastructure of audiovisual services—Coding of moving video", "Advanced Video Coding for Generic Audiovisual Services", ITU-T Recommendation H.264, Mar. 2005, 343 pages.
Barreto, D. et al., "Region-Based Super-Resolution for Compression", Multidimensional Systems and Signal Processing, Special Issue on papers presented at the I International Conference in Super Resolution (Hong Kong, 2006), vol. 18, No. 2-3, pp. 59-81, Sep. 2007.
Sawhney, H. et al. "Hybrid Sereo Camera: An IBR Appoach or Synthesis of Very High Resoluton Stereoscopic Image Sequences", Proc. SIGGRAPH, pp. 451-460, 2001, Vision Technologies Lab., Sarnoff Corp.
Torr, P. et al., "MLESAC: A New Robus Estimator wth Applicaton to Esimatng Image Geometry", Journal of Computer Vision and Image Understanding, vol. 78, No. 1, 2000, pp. 138-156.
Fischler, M. et al., "Random Sample Consensus: A Paradigm for Model Fitting with Applications to Image Analysis and Automated Cartography", Communications of the ACM, Jun. 1981, vol. 24, No. 6, pp. 381-395.
Black, M. et al., "The Robust Estimation of Multiple Motions: Parametric and Piecewise-Smooth Flow Fields", Computer Vision and Image Understanding, vol. 63, No. 1, 1996, pp. 75-104.
Lowe, D., "Distinctive Image Features from Scale-Invariant Keypoints", International Journal of Computer Vision, vol. 2, No. 60, 2004, pp. 91-110.
PCT International Search Report Mailed: Apr. 20, 2011.
Li et al., "Example-Based Image Super-Resolution with Class-Specific Predictors", Journal of Visual Communication and Image Representation, vol. 20, No. 5, Jul. 1, 2009, pp. 312-322.
Lee et al., "Robust Frame Synchronization for Low Signal-to-Noise Ratio Channels Using Energy-Corrected Differential Correlation", EURASIP Journal on Wireless Communications and Networking, vol. 2009 (2009), Article ID 345989, online May 17, 2010, 8 pages.
Cheng et al., "Reduced Resolution Residual Coding for H.264-based Compression System," Proceedings of the 2006 IEEE Int'l. Symposium on Circuits and Systems (ISCAS 2006), May 21, 2006, pp. 3486-3489.
Moffat et al., "Chapter 3. Static Codes," Compression and Coding Algorithms, Feb. 2002, pp. 29-50.
Zhang et al., "A Pattern-based Lossy Compression Scheme for Document Images," Electronic Publishing, vol. 8, No. 2-3, Sep. 24, 1995, pp. 221-233.
Bishop et al., "Super-resolution Enhancement of Video," Proceedings of the 9th Int'l. Workshop on Artificial Intelligence and Statistics, Jan. 3, 2003, pp. 1-8, Society for Artificial Intelligence and Statistics, Key West, Florida.
Bertalmio et al., "Image Inpainting", Proceedings of SIGGRAPH 2000, New Orleans, USA, Jul. 2000, pp. 1-8.
Bhagavathy et al., "A Data Pruning Approach for Video Compression Using Motion-Guided Down-Sampling and Super-Resollution", submitted to ICIP 2010, pp. 1-4.
Dorr et al., "Clustering Sequences by Overlap", International Journal Data Mining and Bioinformatics, vol. 3, No. 3, 2009, pp. 260-279.
Dumitras et al., "An Encoder-Decoder Texture Replacement Method with Application to Content-Based Movie Coding", IEEE Transactions on Circuits and Systems for Video Technology, vol. 14, No. 6, Jun. 2004, pp. 825-840.
Dumitras et al., "A Texture Replacement Method at the Encoder for Bit-Rate Reduction of Compressed Video", IEEE Transactions on Circuits and Systems for Video Technology, vol. 13, No. 2, Feb. 2003, pp. 163-175.
Freeman et al., "Example-based Super-Resolution", IEEE Coomputer Graphics and Applications, Mar./Apr. 2002, pp. 56-65.
Han et al., "Rank-based Image Transformation for Entropy Coding Efficiently", Proceedings of the Fourth Annual ACIS International Conference on Computer and Information Science (ICIS'05), IEEE 2005.
Symes, "Digital Video Compression," McGraw-Hill, ISBN 0-07-142487, pp. 116-121 and 242-243.
Komodakis et al., "Image Completion Using Efficient Belief Propagation Via Priority Scheduling and Dynamic Pruning", IEEE Transactions on Image Processing, vol. 16, No. 11, Nov. 1, 2007, pp. 2649-2661.
Krutz et al., Windowed Image Registration for Robust Mosaicing of Scenes with Large Background Occlusions, ICIP 2006, vol 1-7, IEEE, 2006, pp. 353-356.
Liu et al., "Intra Prediction via Edge-Based Inpainting", IEEE 2008 Data Compression Conference, Mar. 25-27, 2008, pp. 282-291.

(56) References Cited

OTHER PUBLICATIONS

Porikli et al., "Compressed Domain Video Object Segmentation", IEEE Transactions on Circuits and Systems for Video Technology, vol. 20, No. 1, Jan. 2010, pp. 1-14.
Schuster et al., "An Optimal Polygonal Boundary Encoding Scheme in the Rate Distortion Sense", IEEE Transactions on Image Processing, vol. 7, No. 1, Jan. 1998, pp. 13-26.
Sermadevi et al., "Efficient Bit Allocation for Dependent Video Coding", Proceedings of the Data Compression Conference (DCC'04), IEEE, 2004.
Shen et al., "Optimal Pruning Quad-Tree Block-Based Binary Shape Coding", IEEE Proceedings 2007, International Conference on Image Processing, ICIP, 2007, pp. V1-437-V1-440.
Sun et al., "Classified Patch Learning for Spatially Scalable Video Coding", Proceedings of the 16th IEEE International Conference on Image Processing, Nov. 7, 2009, pp. 2301-2304.
Vu et al., "Efficient Pruning Schemes for Distance-Based Outlier Detection", Springer Verlag, Proceedings European Conference 2009, pp. 160-175.
Wiegand et al., "Overview of the H.264/AVC Video Coding Standard", IEEE Transactions on Circuits and Systems for Video Technology, vol. 13, No. 7, Jul. 2003, pp. 560-576.
Wu et al., Image Compression by Visual Pattern Vector Quantization (VPVQ), Proceedings of the 2008 Data Compression Conference, Mar. 25, 2008, pp. 123-131.
Xiong et al., "Block-Based Image Compression with Parameter-Assistant Inpainting", IEEE Transactions on Image Processing, vol. 19, No. 6, Jun. 2010, pp. 1651-1657.
Xu et al., Probability Updating-based Adaptive Hybrid Coding (PUAHC), ISCAS 2006, IEEE 2006, pp. 361-364.
Yap et al., "Unsupervised Texture Segmentation Using Dominant Image Modulations", IEEE Conference Recordings of the 34th Asilomar Conference on Signals, Systems and Computers, IEEE 2000, pp. 911-915.
Zhang et al., "Segmentation for Extended Target in Complex Backgrounds Based on Clustering and Fractal", Optics and Precision Engineering, vol. 17, No. 7, Jul. 2009, pp. 1665-1671.
Zheng et al., "Intra Prediction Using Template Matching with Adaptive Illumination Compensation", ICIP 2008, IEEE 2008, pp. 125-128.
Zhang et al., "Method and Apparatus for Data Pruning for Video Compression Using Example-Based Super-Resolution" Invention Disclosure, Apr. 2010.
Zhang et al., "Example-Based Data Pruning for Improving Video Compression Efficiency", Invention Disclosure, Apr. 2010.
Zhang et al, "Video Decoding Using Blocked-Based Mixed-Resolution", Invention Disclosure, Mar. 2010.
Zhang et al., "Method and Apparatus for Data Pruning for Video Compression Using Example-Based Super-Resolution", Invention Disclosure, Apr. 2010.
Zhang et al, "Video Decoding Using Block-based Mixed-Resolution Data Pruning", Invention Disclosure, Mar. 2010.
International Search Report for Corresponding International Appln. PCT/US2011/050921 dated Jan. 4, 2012.
International Search Report for Corresponding International Appln. PCT/US2011/050923 dated Jan. 5, 2012.
International Search Report for Corresponding Appln. PCT/US2011/050925 dated Jan. 6, 2012.
International Search Report for Corresponding Appln. PCT/US2011/050915 dated Jul. 30, 2012.
International Search Report for Corresponding Appln. PCT/US2011/050922 dated Jan. 4, 2012.
International Search Report for International Application PCT/US11/050924 dated Jan. 5, 2012.
US Office Action for Related U.S. Appl. No. 13/821,078 Dated Jun. 5, 2015.
US Office Action for Related U.S. Appl. No. 13/821,436 Dated Jun. 18, 2015.
US Office Action for Related U.S. Appl. No. 13/821,130 Dated Jun. 16, 2015.
US Office Action for Related U.S. Appl. No. 13/821,393 Dated Jul. 10, 2015.
ISR for related International Application No. PCT/US2011/000107 dated Apr. 20, 2011.
ISR for related International Application No. PCT/US2011/050917 dated Jan. 5, 2012.
Non-Final Office Action for related U.S. Appl. No. 13/820,901 dated May 5, 2015.
ISR for related International Application No. PCT/US2011/050913 dated Jul. 30, 2012.
Non-Final Office Action for related U.S. Appl. No. 13/522,024 dated Mar. 27, 2015.
ISR for related International Application No. PCT/US2011/000117 dated Apr. 29, 2011.
ISR for related International Patent Application No. PCT/US2011/050918 dated Jan. 5, 2012.
ISR for related International Application No. PCT/US2011/050920 dated Jan. 4, 2012.
ISR for related International Application PCT/US2011/050919 dated Jan. 4, 2012.
Non-Final US Office Action for related U.S. Appl. No. 13/821,357 dated Aug. 13, 2015.
Non-Final Office Action for related U.S. Appl. No. 13/821,257 dated Aug. 19, 2015.
Non-Final Office Action for related U.S. Appl. No. 13/821,283 dated Aug. 17, 2015.
Non-Final Office Action for related U.S. Appl. No. 13/821,083 dated Jul. 16, 2015.
Non-Final Office Action for related U.S. Appl. No. 13/821,270 dated Jul. 16, 2015.
US Office Action for Related U.S. Appl. No. 13/821,436 dated Nov. 25, 2015.
CN Search Report for Related CN Application No. 2011800432758 dated Sep. 23, 2015.
CN Search Report for Related CN Application No. 201180006921.3 dated Nov. 21, 2014.
CN Search Report for Related CN Application No. 2011800435953 dated Aug. 18, 2015.
CN Search Report for Related CN Application No. 2011800153355 dated Nov. 22, 2014.
CN Search Report for Related CN Application 2011800437234 dated Sep. 16, 2015.
CN Search Report for Related CN Application 201180054419X dated Sep. 8, 2015.
CN Search Report for Related CN Application 2011800432940 dated Jul. 28, 2015.
CN Search Report for Related CN Application 201180053976.X dated Sep. 23, 2015.
US Office Action for Related U.S. Appl. No. 13/820,901 dated Dec. 18, 2015.
US Office Action for Related U.S. Appl. No. 13/821,257 dated Dec. 21, 2015.
US Office Action for Related U.S. Appl. No. 13/821,130 dated Jan. 14, 2016.
US Office Action for Related U.S. Appl. No. 13/821,357 dated Dec. 21, 2015.
US Office Action for Related U.S. Appl. No. 13/821,393 dated Dec. 11, 2015.
US Office Action for Related U.S. Appl. No. 13/821,078 dated Jan. 13, 2016.
US Office Action for Related U.S. Appl. No. 13/821,283 dated Dec. 22, 2015.
US Office Action for Related U.S. Appl. No. 13/821,083 dated Jan. 29, 2016.
CN Search report for Related CN Application No. 201180054405.8 dated Nov. 30, 2015.
US Notice of Allowance of Allowance for U.S. Appl. No. 13/522,024 dated Mar. 14, 2016.
US Notice of Allowance of Allowance for U.S. Appl. No. 13/821,424 dated Mar. 14, 2016.
Shimauchi, et al., "JPEG Based Image Compression Using Adaptive Multi Resolution Conversion," The 17th Workshop On Circuits

(56) References Cited

OTHER PUBLICATIONS and Systems in Karuizawa. The Institute of Electronics, Information and Communication Engineers, pp. 147-152, Apr. 27, 2004.

Shimauchi Kazuhiro, "JPEG Based Image Compression Using Adaptive Multi Resolution Conversion," The 17th Workshop on Circuits and Systems in Karuizawa, The Institute of Electronics, Information and Communication Engineers, Apr. 27, 2004, pp. 147-152.

Notice of Allowance for U.S. Appl. No. 13/821,393 Dated Mar. 18, 2016.

US Non-Final Office Action for U.S. Appl. No. 13/821,130 Dated Jul. 11, 2016.

US Non-Final Office Action for U.S. Appl. No. 13/821,436 Dated Jul. 11, 2016.

US Non-Final Office Action for U.S. Appl. No. 13/820,901 Dated May 18, 2016.

US Final Office for U.S. Appl. No. 13/821,270 Dated Feb. 26, 2016.

\* cited by examiner

METHODS AND APPARATUS FOR SAMPLING-BASED SUPER RESOLUTION VIDEO ENCODING AND DECODING

CROSS-REFERENCE TO RELATED APPLICATIONS

This application claims the benefit, under 35 U.S.C. §365 of International Application PCT/US2011/000107 and filed Jan. 20, 2011, which was published in accordance with PCT Article 21(2) on Jul. 28, 2011, in English, and which claims the benefit of United States Provisional Patent Application Ser. No. 61/297,320, filed on Jan. 22, 2010, in English, which are incorporated by reference in their respective entireties.

TECHNICAL FIELD

The present principles relate generally to video encoding and decoding and, more particularly, to methods and apparatus for sampling-based super resolution video encoding and decoding.

BACKGROUND

A video compression approach using super resolution was proposed in a first prior art approach. In the first prior art approach, the spatial size of the input video is reduced to a certain predetermined low resolution (LR) size before encoding. After the low resolution video is received at the decoder side, the low resolution video is up-scaled to the original size using a super resolution method along with some side information (metadata) transmitted with the bitstream. The metadata includes a block-based segmentation of frames where each block is labeled as moving, non-moving flat, and non-moving textured. Non-moving flat blocks are up-scaled by spatial interpolation. For moving blocks, motion vectors are sent to the receiver where a super resolution technique is applied in order to recover sub-pixel information. For non-moving textured blocks, a jittered down-sampling strategy is used wherein four complementary down-sampling grids are applied in rotating order.

However, the aforementioned first prior art approach disadvantageously does not use a smart sampling strategy for moving regions. Rather, the first prior art approach relies on the presence of sub-pixel motion between the low resolution frames in order to obtain super resolution. However, sub-pixel motion is not always guaranteed.

In a second prior art approach, a camera is mechanically moved in sub-pixel shifts between frame captures. The goal is to capture low resolution video which is better suited for subsequent super resolution. For static backgrounds, the method of the second prior art approach is analogous to the jittered sampling idea in aforementioned first prior art approach. However, a fixed jitter is not an effective strategy for the case of non-static backgrounds which is likely in our targeted application, namely, down-sampling high resolution video for subsequent super resolution.

SUMMARY

These and other drawbacks and disadvantages of the prior art are addressed by the present principles, which are directed to methods and apparatus for sampling-based super resolution video encoding and decoding.

According to an aspect of the present principles, there is provided an apparatus. The apparatus includes a down-sampler and metadata generator for receiving high resolution pictures and generating low resolution pictures and metadata there from. The metadata is for guiding post-decoding post-processing of the low resolution pictures and the metadata. The apparatus further includes at least one encoder for encoding the low resolution pictures and the metadata.

According to another aspect of the present principles, there is provided a method. The method includes receiving high resolution pictures and generating low resolution pictures and metadata there from. The metadata is for guiding post-decoding post-processing of the low resolution pictures and the metadata. The method further includes encoding the low resolution pictures and the metadata using at least one encoder.

According to yet another aspect of the present principles, there is provided an apparatus. The apparatus includes a decoder for receiving a bitstream and decoding low resolution pictures and metadata there from. The apparatus further includes a super resolution post-processor for reconstructing high resolution pictures respectively corresponding to the low resolution pictures using the low resolution pictures and the metadata.

According to still another aspect of the present principles, there is provided a method. The method includes receiving a bitstream and decoding low resolution pictures and metadata there from using a decoder. The method further includes reconstructing high resolution pictures respectively corresponding to the low resolution pictures using the low resolution pictures and the metadata.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

Figure 1:
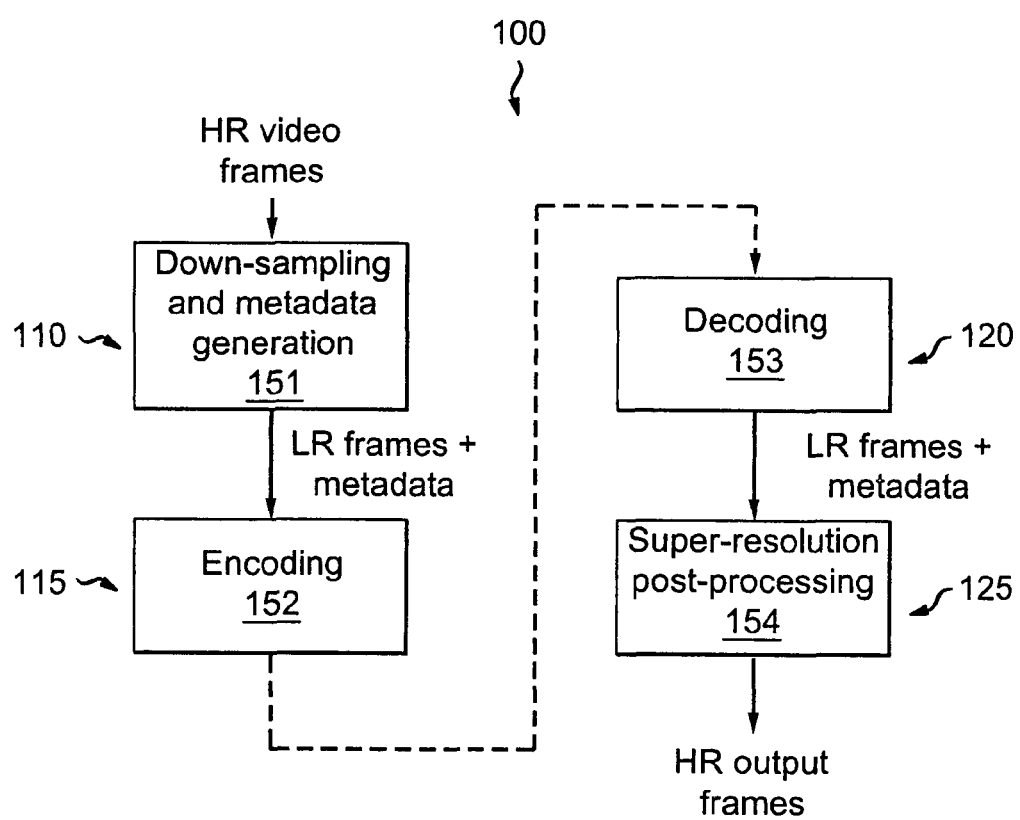
FIG. 1 is a high level block diagram showing an exemplary system/method for sampling-based super resolution, in accordance with an embodiment of the present principles.

The present principles are directed to methods and apparatus for sampling-based super resolution video encoding and decoding.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Also, as used herein, the words "picture" and "image" are used interchangeably and refer to a still image or a picture from a video sequence. As is known, a picture may be a frame or a field.

Additionally, as used herein, the words "surrounding co-located pixels" when used, for example, with respect to creating the high resolution mosaic described herein by interpolating pixel values at pixel positions in the high resolution mosaic from pixel values of "surrounding co-located pixels" in the low resolution pictures, refers to pixels in the low resolution pictures that surround a particular pixel that is co-located (i.e., has the same position) as a target pixel currently being interpolated in the high resolution mosaic.

As noted above, the present principles are directed to methods and apparatus for sampling-based super resolution video encoding and decoding. It is to be appreciated that the present principles advantageously improve video compression efficiency. In particular, a smart down-sampling strategy which is capable of handling motion between frames is proposed. At the pre-processing stage, high-resolution (HR) frames are down-sampled to low-resolution (LR) and metadata is generated to guide post-processing. In the post-processing stage, the decoded low resolution frames and received metadata are used within a novel super resolution framework to reconstruct high resolution frames. Since only low resolution frames are encoded and the amount of metadata transmitted is low to moderate, this approach has the potential to provide increased compression ratios.

The smart down-sampling strategy takes into account motion between frames. The down-sampling strategy contributes to an improved super resolution result by creating LR frames such that they complement one another in the pixel information they carry (in other words, reducing pixel redundancy between frames). In some sense, the strategy attempts to enforce sub-pixel motion between frames.

We note that conventional video compression methods (mainly block-based prediction methods such as, for example, the International Organization for Standardization/International Electrotechnical Commission (ISO/IEC) Moving Picture Experts Group-4 (MPEG-4) Part 10 Advanced Video Coding (AVC) Standard/International Telecommunication Union, Telecommunication Sector (ITU-T) H.264 Recommendation (hereinafter the "MPEG-4 AVC Standard"), have started reaching saturation points in compression ratios. Data pruning methods aim at improving compression efficiency beyond that achieved by standard compression methods. The main principle of such methods is to remove data before (or during) encoding and putting back the removed data at the receiver after (or during) decoding. Data pruning methods have exploited a variety of pre- and post-processing techniques for achieving their goal, e.g., block/region removal and inpainting, line removal and interpolation, and so forth.

In accordance with the present principles, intelligent down-sampling (at the transmitter) and super resolution (at the receiver) are the techniques exploited for data pruning. Super resolution is the process of increasing the resolution of images or videos by temporally integrating information across several low resolution images or frames. The principle of this data pruning approach is illustrated in FIG. 1. Turning to FIG. 1, an exemplary system/method for sampling-based super resolution is indicated generally by the reference numeral 100. High resolution (HR) frames are input and subjected to down-sampling and metadata generation at step 110 (by a down-sampler and metadata generator 151) in order to obtain low resolution (LR) frames and metadata. The low resolution frames and metadata are encoded (by an encoder 152) at step 115. The encoded low resolution frames and metadata are decoded (by a decoder 153) at step 120. The low resolution frames and metadata are subjected to super resolution post-processing (by a super resolution post-processor 154) in order to provide high resolution output frames at step 130. Thus, at the pre-processing stage (step 110), high resolution frames are down-sampled to low resolution and metadata is generated to guide post-processing. In particular, a smart down-sampling strategy which is capable of handling motion between frames is proposed. In the post-processing stage (step 125), the decoded low resolution frames and received metadata are used within a novel super resolution framework to reconstruct high resolution frames. Since only low resolution frames are encoded and the amount of metadata transmitted is low to moderate, increased compression ratios can be obtained using this approach. We note that the down-sampler and metadata generator 151 may also be considered and referred to as a pre-processor herein.

Figure 2:
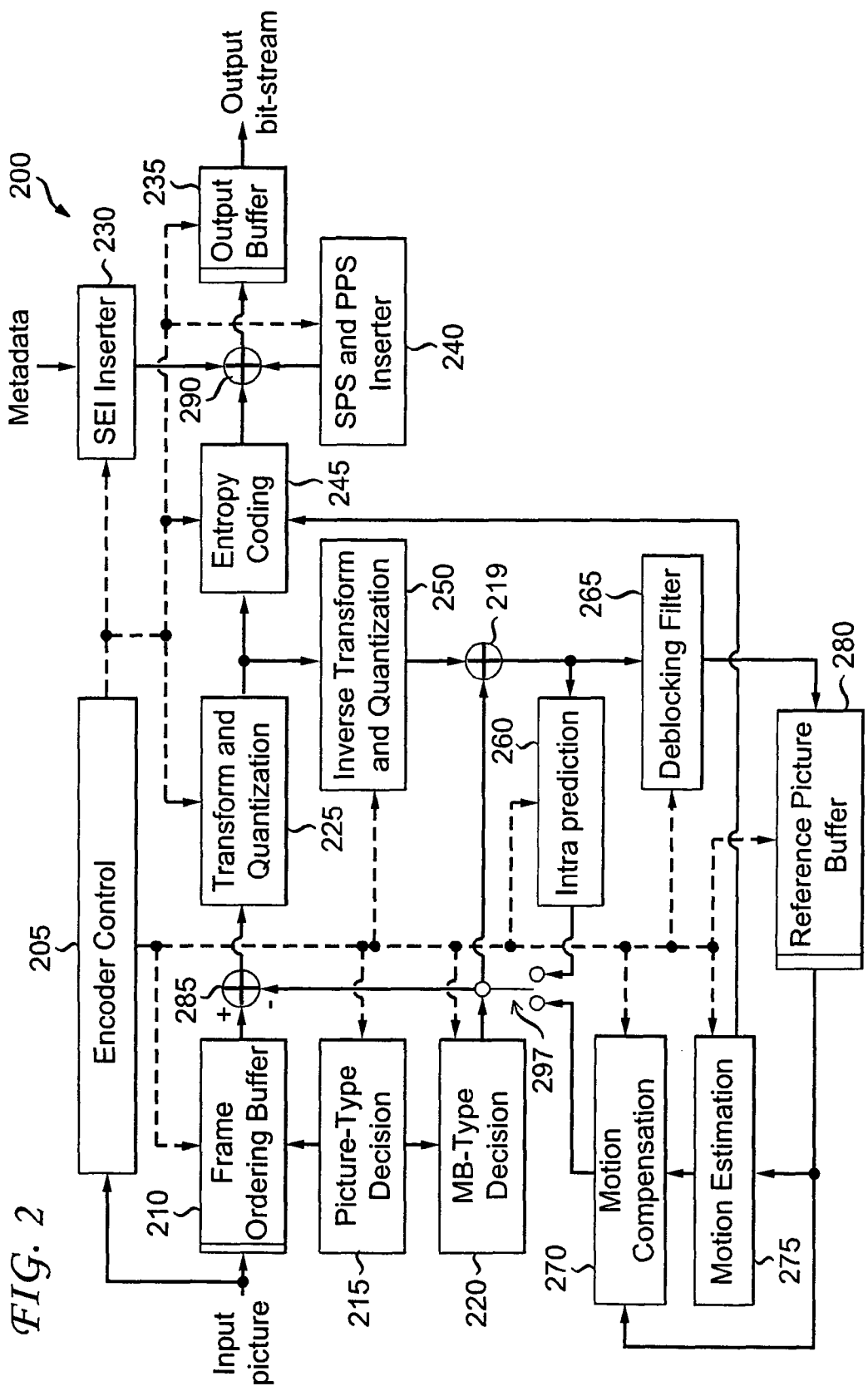
FIG. 2 is a block diagram showing an exemplary video encoder to which the present principles may be applied, in accordance with an embodiment of the present principles.
Figure 3:
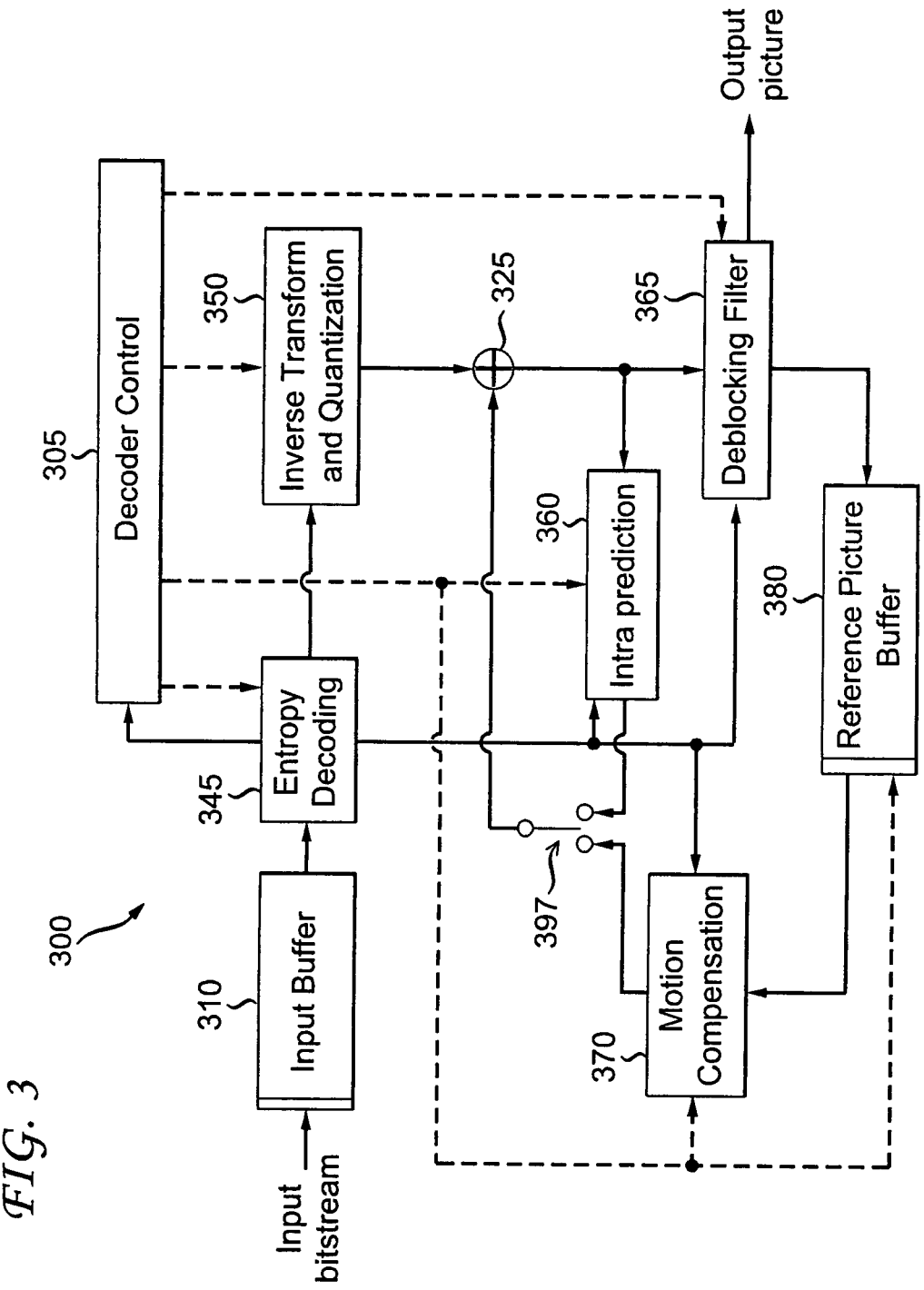
FIG. 3 is a block diagram showing an exemplary video decoder to which the present principles may be applied, in accordance with an embodiment of the present principles.

While not limited to the specific configurations of the following described encoder and decoder, encoder 152 and decoder 153 can be respectively implemented as shown in FIGS. 2 and 3, respectively.

Turning to FIG. 2, an exemplary video encoder to which the present principles may be applied is indicated generally by the reference numeral 200. The video encoder 200 includes a frame ordering buffer 210 having an output in signal communication with a non-inverting input of a combiner 285. An output of the combiner 285 is connected in signal communication with a first input of a transformer and quantizer 225. An output of the transformer and quantizer 225 is connected in signal communication with a first input of an entropy coder 245 and a first input of an inverse transformer and inverse quantizer 250. An output of the entropy coder 245 is connected in signal communication with a first non-inverting input of a combiner 290. An output of the combiner 290 is connected in signal communication with a first input of an output buffer 235.

A first output of an encoder controller 205 is connected in signal communication with a second input of the frame ordering buffer 210, a second input of the inverse transformer and inverse quantizer 250, an input of a picture-type decision module 215, a first input of a macroblock-type (MB-type) decision module 220, a second input of an intra prediction module 260, a second input of a deblocking filter 265, a first input of a motion compensator 270, a first input of a motion estimator 275, and a second input of a reference picture buffer 280.

A second output of the encoder controller 205 is connected in signal communication with a first input of a Supplemental Enhancement Information (SEI) inserter 230, a second input of the transformer and quantizer 225, a second input of the entropy coder 245, a second input of the output buffer 235, and an input of the Sequence Parameter Set (SPS) and Picture Parameter Set (PPS) inserter 240.

An output of the SEI inserter 230 is connected in signal communication with a second non-inverting input of the combiner 290.

A first output of the picture-type decision module 215 is connected in signal communication with a third input of the frame ordering buffer 210. A second output of the picture-type decision module 215 is connected in signal communication with a second input of a macroblock-type decision module 220.

An output of the Sequence Parameter Set (SPS) and Picture Parameter Set (PPS) inserter 240 is connected in signal communication with a third non-inverting input of the combiner 290.

An output of the inverse quantizer and inverse transformer 250 is connected in signal communication with a first non-inverting input of a combiner 219. An output of the combiner 219 is connected in signal communication with a first input of the intra prediction module 260 and a first input of the deblocking filter 265. An output of the deblocking filter 265 is connected in signal communication with a first input of a reference picture buffer 280. An output of the reference picture buffer 280 is connected in signal communication with a second input of the motion estimator 275 and a third input of the motion compensator 270. A first output of the motion estimator 275 is connected in signal communication with a second input of the motion compensator 270. A second output of the motion estimator 275 is connected in signal communication with a third input of the entropy coder 245.

An output of the motion compensator 270 is connected in signal communication with a first input of a switch 297. An output of the intra prediction module 260 is connected in signal communication with a second input of the switch 297. An output of the macroblock-type decision module 220 is connected in signal communication with a third input of the switch 297. The third input of the switch 297 determines whether or not the "data" input of the switch (as compared to the control input, i.e., the third input) is to be provided by the motion compensator 270 or the intra prediction module 260. The output of the switch 297 is connected in signal communication with a second non-inverting input of the combiner 219 and an inverting input of the combiner 285.

A first input of the frame ordering buffer 210 and an input of the encoder controller 205 are available as inputs of the encoder 200, for receiving an input picture. Moreover, a second input of the Supplemental Enhancement Information (SEI) inserter 230 is available as an input of the encoder 200, for receiving metadata. An output of the output buffer 235 is available as an output of the encoder 200, for outputting a bitstream.

Turning to FIG. 3, an exemplary video decoder to which the present principles may be applied is indicated generally by the reference numeral 300. The video decoder 300 includes an input buffer 310 having an output connected in signal communication with a first input of an entropy decoder 345. A first output of the entropy decoder 345 is connected in signal communication with a first input of an inverse transformer and inverse quantizer 350. An output of the inverse transformer and inverse quantizer 350 is connected in signal communication with a second non-inverting input of a combiner 325. An output of the combiner 325 is connected in signal communication with a second input of a deblocking filter 365 and a first input of an intra prediction module 360. A second output of the deblocking filter 365 is connected in signal communication with a first input of a reference picture buffer 380. An output of the reference picture buffer 380 is connected in signal communication with a second input of a motion compensator 370.

A second output of the entropy decoder 345 is connected in signal communication with a third input of the motion compensator 370, a first input of the deblocking filter 365, and a third input of the intra predictor 360. A third output of the entropy decoder 345 is connected in signal communication with an input of a decoder controller 305. A first output of the decoder controller 305 is connected in signal communication with a second input of the entropy decoder 345. A second output of the decoder controller 305 is connected in signal communication with a second input of the inverse transformer and inverse quantizer 350. A third output of the decoder controller 305 is connected in signal communication with a third input of the deblocking filter 365. A fourth output of the decoder controller 305 is connected in signal communication with a second input of the intra prediction module 360, a first input of the motion compensator 370, and a second input of the reference picture buffer 380.

An output of the motion compensator 370 is connected in signal communication with a first input of a switch 397. An output of the intra prediction module 360 is connected in signal communication with a second input of the switch 397. An output of the switch 397 is connected in signal communication with a first non-inverting input of the combiner 325.

An input of the input buffer 310 is available as an input of the decoder 300, for receiving an input bitstream. A first output of the deblocking filter 365 is available as an output of the decoder 300, for outputting an output picture.

Principle of Sampling-Based Super Resolution

Figure 4A:
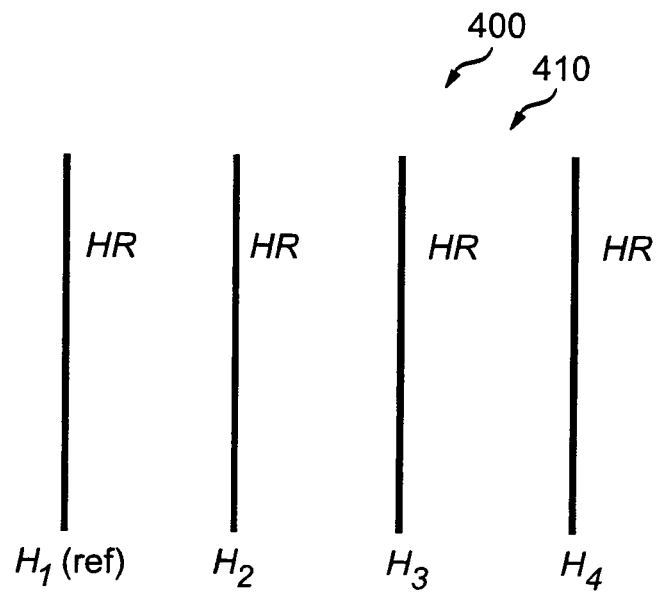
FIGS. 4A-D are diagrams showing data and steps relating to the pre-processing stage of a sampling-based super resolution method, in accordance with an embodiment of the present principles.
Figure 4B:
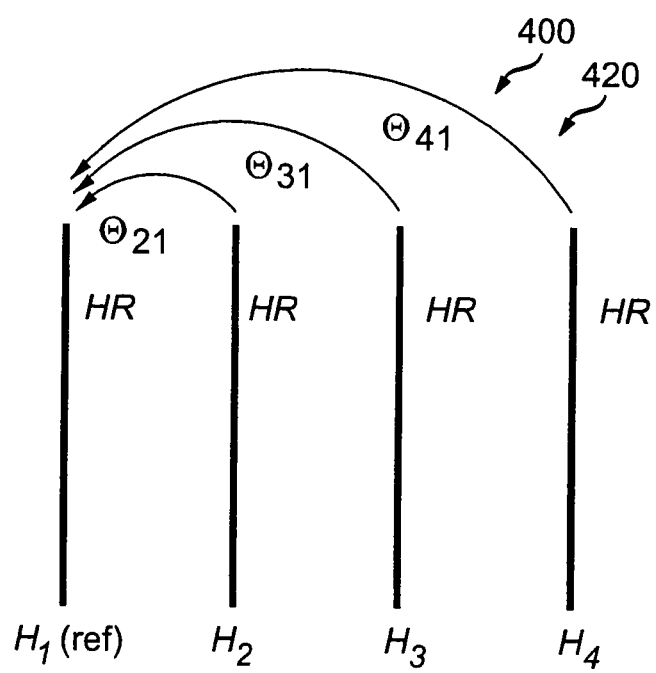
Figure 4C:
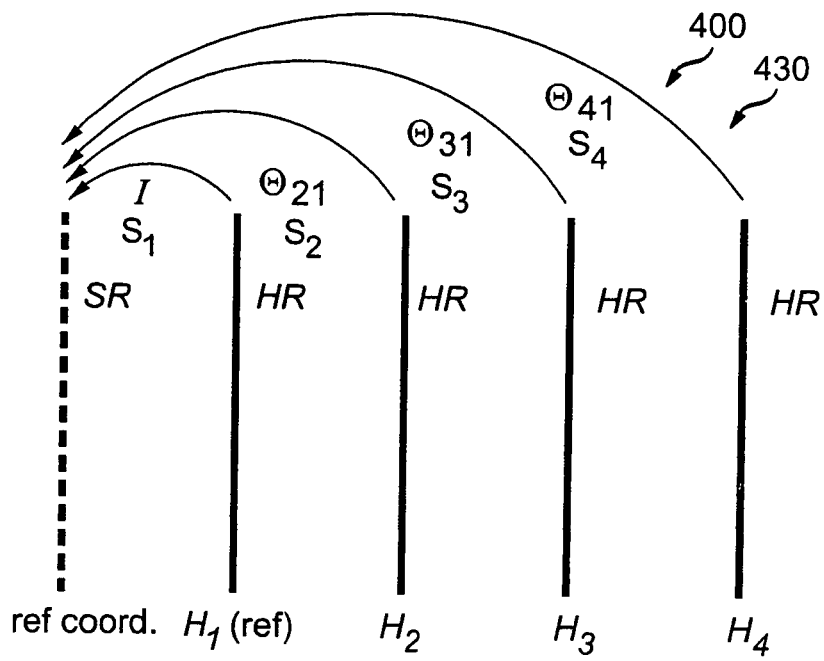
Figure 4D:
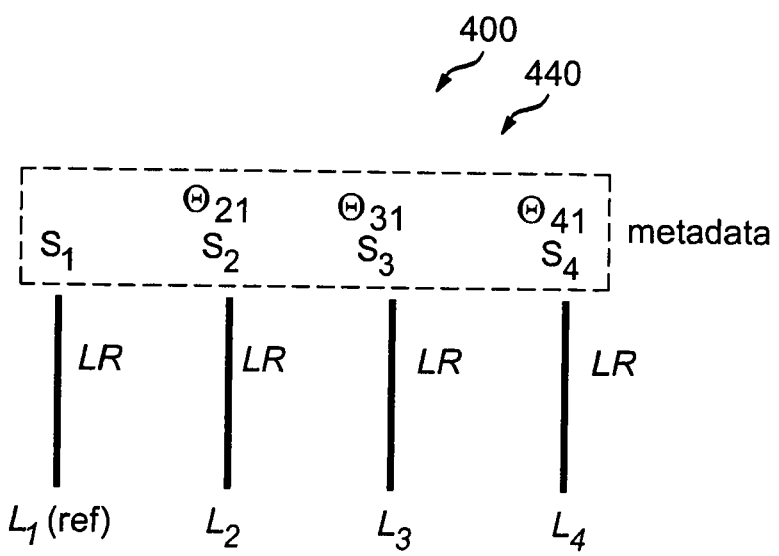

The central idea of sampling-based SR is illustrated in FIGS. 4A-D and 5A-D. Turning to FIGS. 4A-D, data and steps relating to the pre-processing stage of a sampling-based super resolution method are indicated generally by the reference numeral 400. In particular, FIG. 4A shows an input set of high resolution (HR) frames 410. FIG. 4B shows the estimation 420 of motion transformations $\Theta_{r1}$ with respect to the reference frame. FIG. 4C shows the estimation 430 of sampling grids $S_t$ based on a super resolution filling factor in reference frame coordinates (note that I refers to an identity transform). FIG. 4D shows down-sampled low resolution (LR) frames and corresponding metadata 440.

Figure 5A:
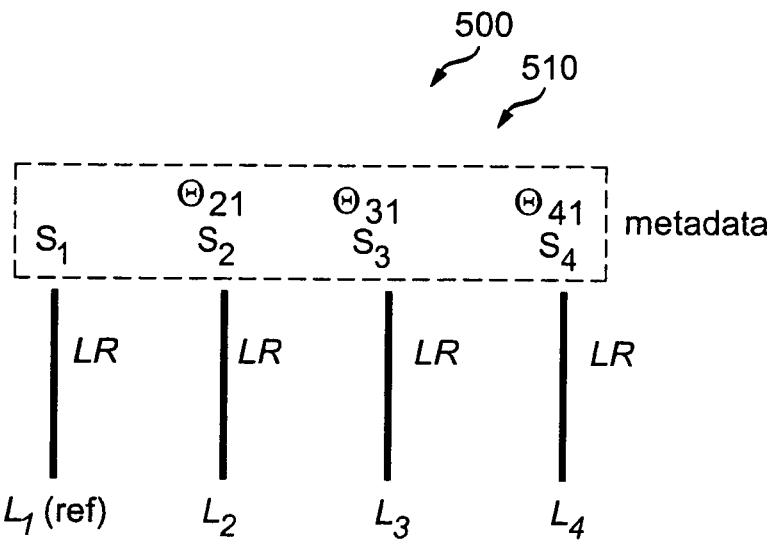
FIGS. 5A-5D are diagrams showing data and steps relating to the post-processing stage of a sampling-based super resolution method, in accordance with an embodiment of the present principles.
Figure 5B:
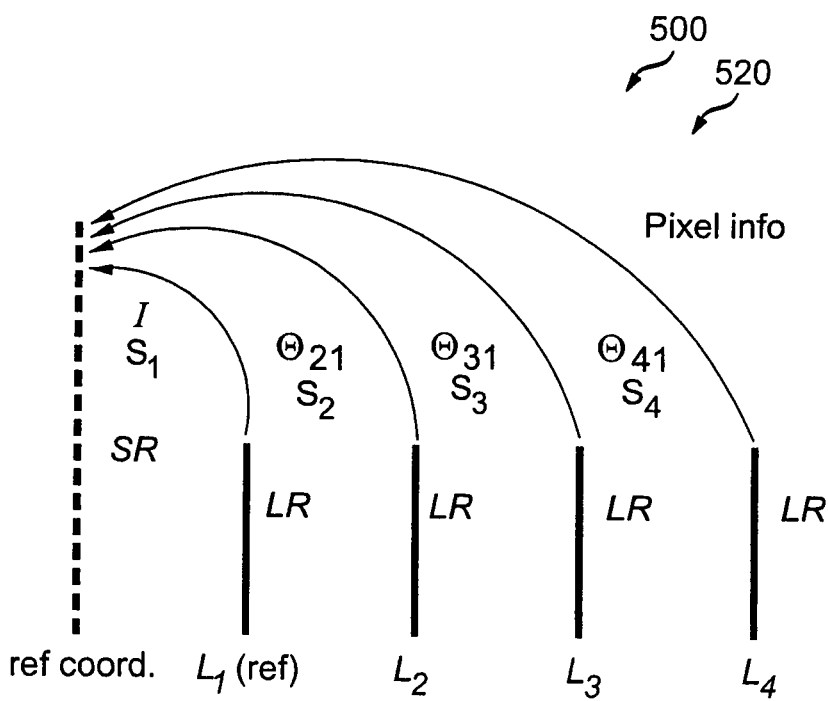
Figure 5C:
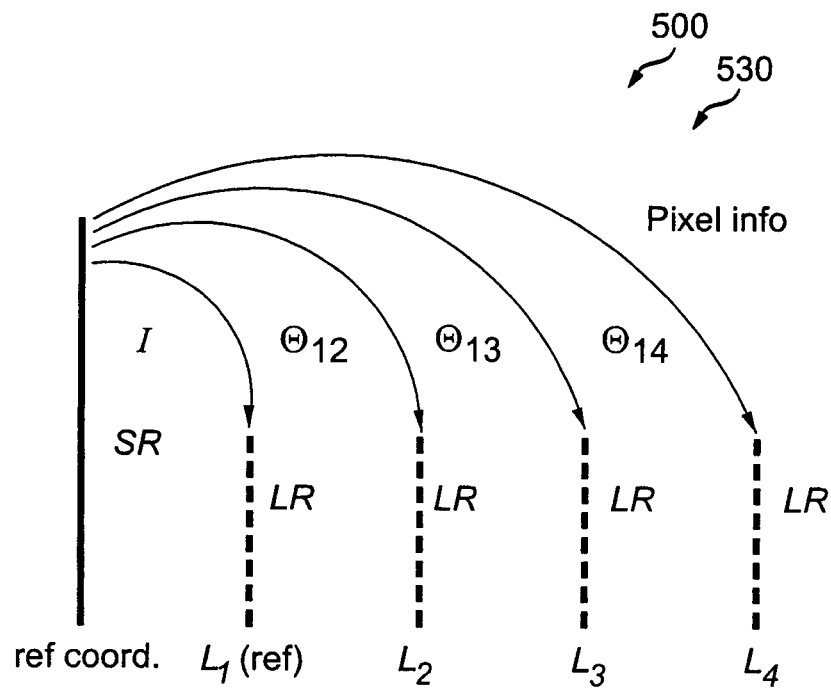
Figure 5D:
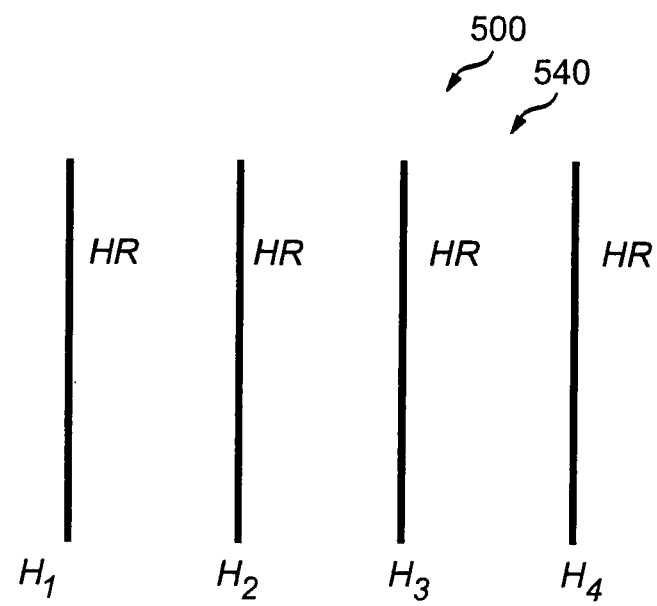

Turning to FIGS. 5A-5D, data and steps relating to the post-processing stage of a sampling-based super resolution method are indicated generally by the reference numeral 500. In particular, FIG. 5A shows a decoded set 510 of low resolution frames and metadata. FIG. 5B shows the creation 520 of a super resolution mosaic from low resolution frames in reference frame coordinates (note that I refers to an identity transform). FIG. 5C shows the reconstruction 530 of high resolution frames from the super resolution mosaic. FIG. 5D shows super resolved high resolution frames 540.

Referring to FIG. 5A, which relates to the post-processing stage, initially a set of decoded LR frames $\hat{L}_1$-$\hat{L}_4$ is available along with some relevant metadata. One of the frames is known to be a reference frame ($\hat{L}_1$ in FIG. 5A). In FIG. 5B, a super resolution mosaic is constructed after transforming the pixels in the low resolution frames into a common coordinate system (coinciding with that of the reference frame) using the metadata information. Thereafter, with respect to FIG. 5C, each high resolution frame in the set is reconstructed by combining the information in the super resolution mosaic (transformed back to the current frame coordinates) and the corresponding low resolution frame using the metadata information. In order to carry out the above post-processing steps, the metadata needs to describe the motion of pixels between each frame and the reference frame, and the down-sampling process used to create each low resolution frame from the corresponding high resolution frame (at the pre-processing stage). This information is determined at the pre-processing stage and sent as metadata.

Referring to FIG. 4A, an input high resolution video is divided into sets of frames which are processed separately. Let us consider a set of high resolution frames $H_1$-$H_4$ where $H_1$ is taken to be the reference frame. In FIG. 4B, the motion between each frame and the reference frame is estimated. In FIG. 4B, the motion transformation from $H_t$ to $H_1$ is denoted by $\Theta_{r1}$. In FIG. 4C, the (down-)sampling grids $S_t$ are selected for each frame $H_t$ in order to create the corresponding low resolution frame $L_t$. In FIG. 4D, the (downsampled) low resolution frames $L_t$ can be compressed using an encoder and sent to the receiver along with the corresponding metadata (motion and sampling grid information). In the post-processing stage at the receiver, the decoded low resolution frames along with the metadata information are used to reconstruct the high resolution frames as described earlier.

In the following, we shall further describe the steps involved in the pre-processing and post-processing stages.

Pre-Processing Stage of Sampling-Based Super Resolution

In the pre-processing stage, the input high resolution video is first divided into sets of contiguous frames. Each set is then processed separately. Typically, we choose $M^2$ frames in each set where M is the down-sampling factor, i.e., the ratio of high resolution to low resolution frame dimensions. The reasoning here is that a high resolution frame includes $M^2$ times the number of pixels as a low resolution frame, therefore it should take $M^2$ LR frames to construct a super resolution mosaic with the same size as a high resolution frame.

Let us now consider the case where the down-sampling factor is 2 (i.e., M=2) and then consider a set of four high resolution frames ($H_t$; t=1, 2, 3, 4).

Figure 6:
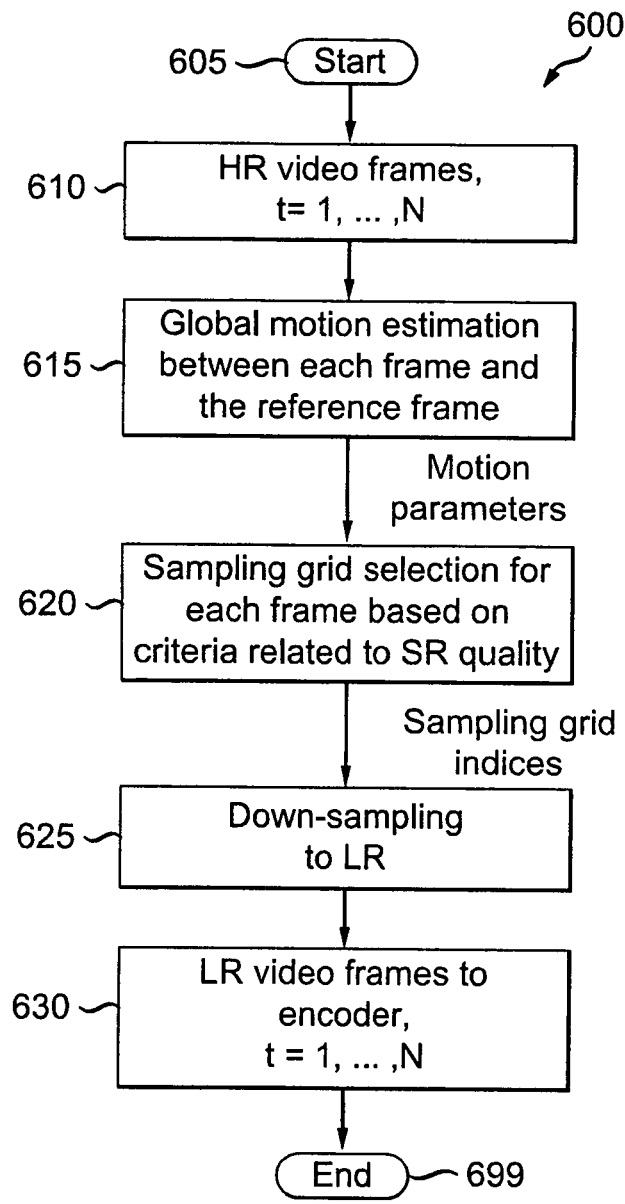
FIG. 6 is a flow diagram showing an exemplary method relating to a pre-processing stage of a sampling-based super resolution method, in accordance with an embodiment of the present principles.

Turning to FIG. 6, an exemplary method relating to a pre-processing stage of a sampling-based super resolution method is indicated generally by the reference numeral 600.

The method 600 includes a start block 605 that passes control to a function block 610. The function block 610 inputs high resolution video frames, t=1, . . . , N, and passes control to a function block 615. The function block 615 performs global motion estimation between each frame and the reference frame to obtain motion parameters there for, and passes control to a function block 620. The function block 620 performs a sampling grid selection for each frame based on criteria related to super resolution quality to obtain sampling grid indices, and passes control to a function block 625. The function block 625 down-samples the high resolution frames in order to obtain low resolution frames, and passes control to a function block 630. The function block 630 outputs the low resolution frames, t=1, . . . , N, to an encoder, and passes control to an end block 699.

Further details relating to the steps involved in the pre-processing stage (e.g., as shown with respect to FIGS. 4 and 6) are provided as follows:

1. Motion estimation: Let $H_1$ be the reference frame. Estimate the motion from each frame $H_t$ to the reference frame (FIG. 4B). The motion transformation from $H_t$ to $H_1$ is denoted by $\Theta_{t1}$.

2. Sampling grid selection: For each frame $H_t$, the sampling grid $S_t$ indicates the pixels that are taken from $H_t$ in order to create the corresponding LR frame $L_t$. The grids $S_t$ are chosen such that each frame provides complementary pixel information for the super resolution process in the post-processing stage (FIGS. 5A-5D). Motion between frames is accounted for during the grid selection process.

3. Down-sampling: Using the selected grids $S_t$, each of the low resolution frames $L_t$ is created. The low resolution frames are then compressed using an encoder and sent to the receiver. Information regarding the motion between the frames and the sampling grids used are also sent as meta-data.

Each of the preceding steps will be further described herein after.

Motion Estimation

For illustrative purposes, we will now discuss one way of estimating the motion between each frame $H_t$ in a given set to the reference frame of the set (FIG. 4B). Without loss of generality, it is presumed that the reference frame is $H_1$. Let us simplify the problem by presuming that there is only global motion among the frames. In other words, we presume that the motion of the pixels between any two frames can be described by a global transformation with a few parameters. Examples of global transformations include translation, rotation, affine warp, projective transformation, and so forth.

In order to estimate the motion from frame $H_i$ to frame $H_j$, we first choose a parametric global motion model that describes the motion between frames. Using the data from $H_i$ and $H_j$, the parameters $\theta_{ij}$ of the model are then determined. Henceforth, we shall denote the transformation by $\Theta_{ij}$ and its parameters by $\theta_{ij}$. The transformation $\Theta_{ij}$ can then be used to align (or warp) $H_i$ to $H_j$ (or vice versa using the inverse model $\Theta_{ji}=\Theta_{ij}^{-1}$).

Global motion can be estimated using a variety of models and methods. One commonly used model is the projective transformation given as follows:

$$x' = \frac{a_1 x + a_2 y + a_3}{c_1 x + c_2 y + 1}, y' = \frac{b_1 x + b_2 y + b_3}{c_1 x + c_2 y + 1}. \quad (1)$$

The above equations give the new position (x', y') in $H_j$ to which the pixel at (x, y) in $H_i$ has moved. Thus, the eight model parameters $\theta_{ij}=\{a_1, a_2, a_3, b_1, b_2, b_3, c_1, c_2\}$ describe the motion from $H_i$ to $H_j$. The parameters are usually estimated by first determining a set of point correspondences between the two frames and then using a robust estimation framework such as RANdom SAmple Consensus (RANSAC) or its variants. Point correspondences between frames can be determined by a number of methods, e.g. extracting and matching Scale-invariant Feature Transform (SIFT) features or using optical flow.

For the sampling-based super resolution procedure, the motion between each frame $H_t$ to the reference frame ($H_1$) has to be estimated. Hence, three sets of parameters are estimated: $\theta_{21}$; $\theta_{31}$; and $\theta_{41}$ (corresponding to transformations $\Theta_{21}$, $\Theta_{31}$ and $\Theta_{41}$, respectively). The transformation is invertible and the inverse model $\Theta_{ij}=\Theta_{ij}^{-1}$ describes the motion from $H_j$ to $H_i$.

Sampling Grid Selection

Figure 7A:
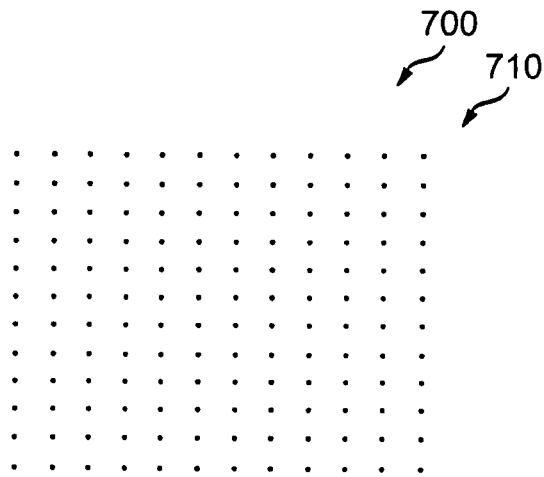
FIGS. 7A-7F are diagrams showing examples of sampling grids used for down-sampling HR high resolution (HR) frames to low resolution (LR), in accordance with an embodiment of the present principles.
Figure 7B:
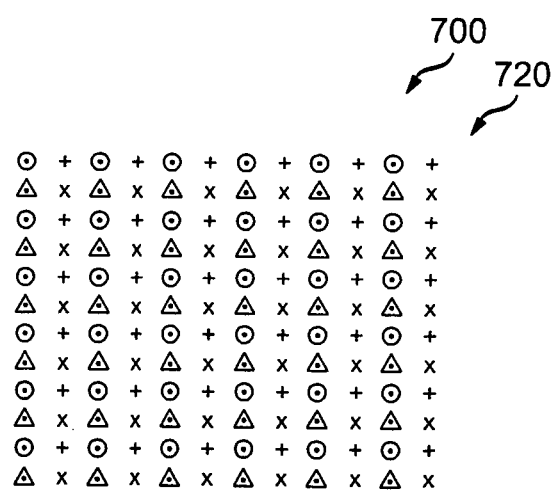
Figure 7C:
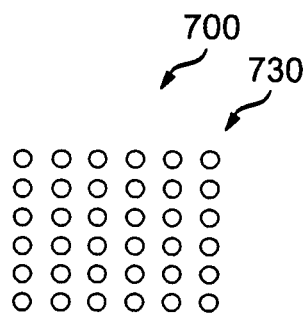
Figure 7D:
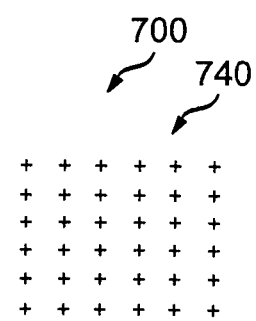
Figure 7E:
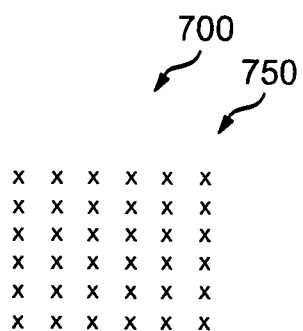
Figure 7F:
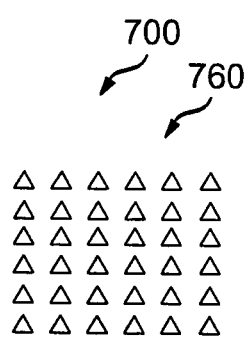

For each high resolution frame $H_t$, a sampling grid $S_t$ has to be selected in order to down-sample the frame and create the low resolution version $L_t$. A sampling grid indicates the pixels in the high resolution frame that are taken and packed into the corresponding low resolution frame. Turning to FIGS. 7A-7F, examples of sampling grids used for down-sampling HR high resolution (HR) frames to low resolution (LR) are indicated generally by the reference numeral 700. In further detail, FIG. 7A shows the pixels 710 in the high resolution frames. FIG. 7B shows four uniform sampling grids 720 with a down-sampling factor of 2. A symbol "o" represents a first sampling grid $g_1$, a symbol "+" represents a second sampling grid $g_2$, a symbol "x" represents a third sampling grid $g_3$, and a symbol "Δ" represents a fourth sampling grid $g_4$. FIG. 7C shows the low resolution frame 730 resulting from the first sampling grid $g_1$. FIG. 7D shows the low resolution frame 740 resulting from the second grid $g_2$. FIG. 7E shows the low resolution frame 750 resulting from the third grid $g_3$. FIG. 7F shows the low resolution frame 460 resulting from the fourth grid $g_4$.

Figure 8A:
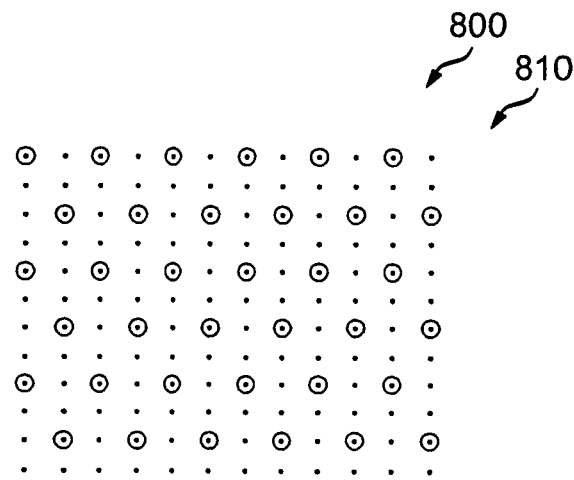
FIGS. 8A-8D are diagrams showing additional uniform sampling grids, in accordance with an embodiment of the present principles.
Figure 8B:
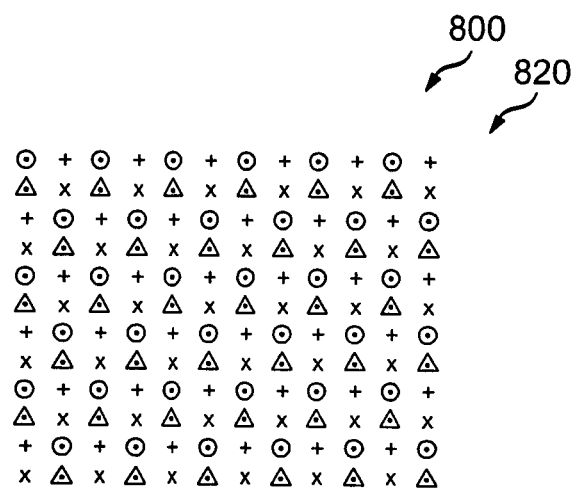
Figure 8C:
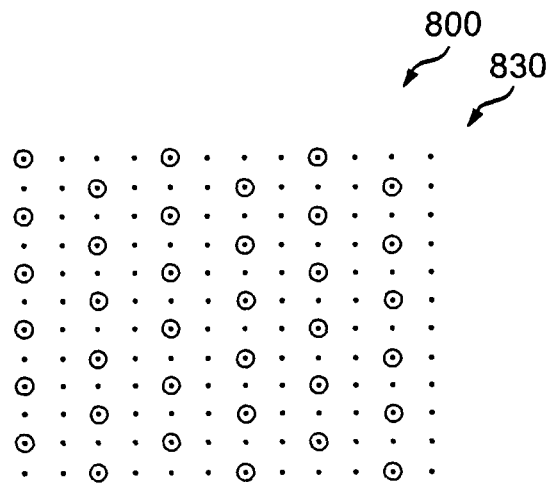
Figure 8D:
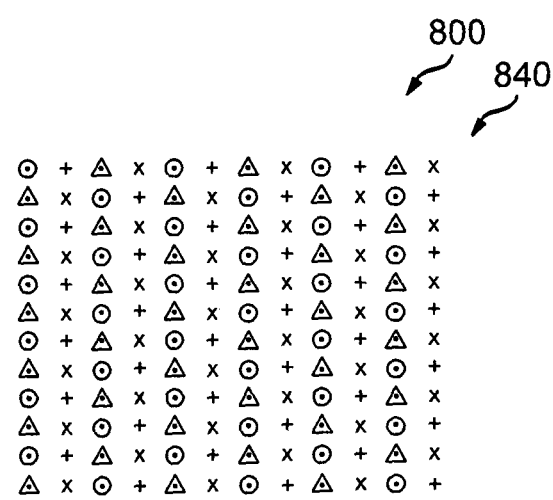
Figure 9A:
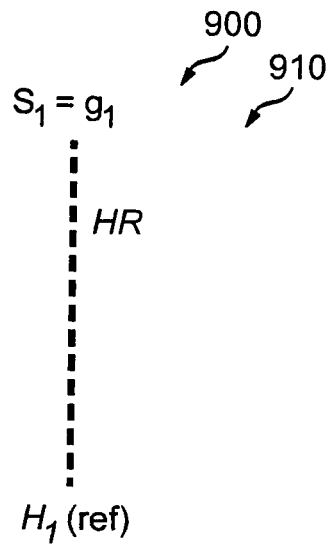
FIG. 9 is a diagram showing steps relating to the selection of sampling grids, in accordance with an embodiment of the present principles.
Figure 9B:
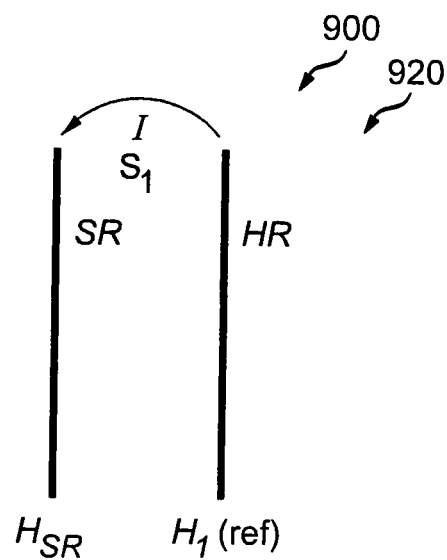
Figure 9C:
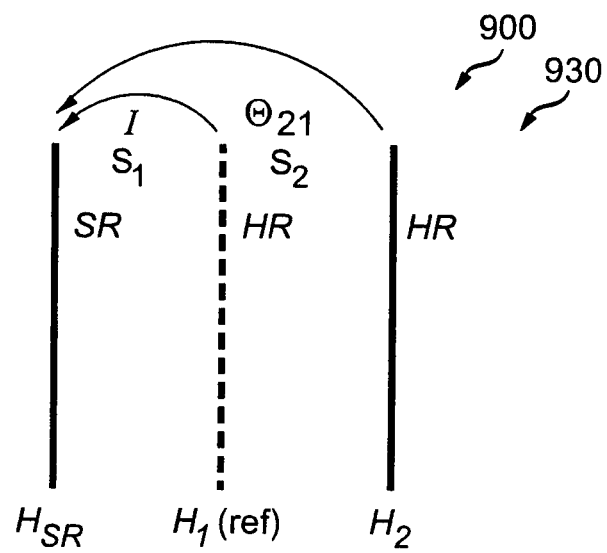
Figure 9D:
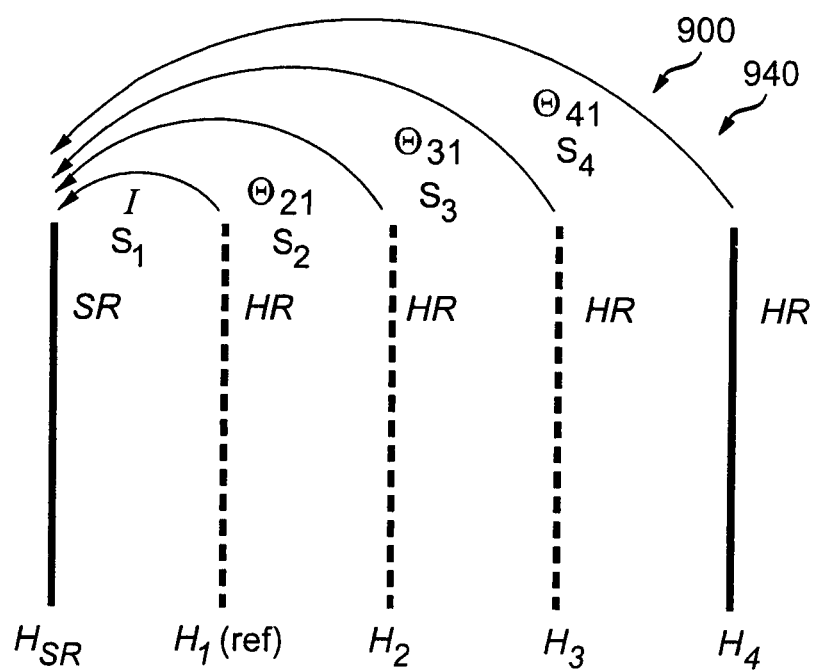

Turning to FIGS. 8A-8D, additional uniform sampling grids are indicated generally by the reference numeral 800. In further detail, FIG. 8A shows a horizontally staggered grid 810. FIG. 8B shows sampling grids $g_5$, $g_6$, $g_7$, and $g_8$, collectively indicated by the reference numeral 820, and individually represented by the following respective symbols: o; +; x; and Δ. FIG. 8C shows a vertically staggered sampling grid 830. FIG. 8D shows sampling grids $g_9$, $g_{10}$, $g_{11}$, and $g_{12}$, collectively indicated by the reference numeral 840, and individually represented by the following respective symbols: o; +; x; and Δ.

Let us constrain ourselves here to use only uniform sampling grids, i.e., those that have a uniform density of coverage across all portions of the high resolution frame. There are distinct advantages of using a uniform grid. First, it roughly preserves the spatial and temporal relationships present among pixels in the high resolution frames and this helps the encoder (e.g., encoder 115 in FIG. 1, encoder 200 in FIG. 2) exploit spatio-temporal redundancies in the video for efficient compression. Second, in case the sampling-based super resolution system fails, a uniformly sampled frame can then be spatially interpolated to create a high resolution frame, thus ensuring a minimum quality of experience. Third, it is easier to pack pixels sampled using a uniform grid into a low resolution frame.

The sampling grid selection process is posed as a problem of selecting, for each high resolution frame $H_t$, an appropriate sampling grid $S_t$ from a candidate pool of grids $G=\{g_i;$ $i=1, \ldots, N_G\}$. In one embodiment, we choose from 12 candidate grids $g_1$-$g_{12}$ shown in FIGS. 7B, 8B, and 8D. Note that the staggered grids $g_5$-$g_{12}$ can potentially capture slightly rotated or sheared grids of pixels better than the rectangular grids $g_1$-$g_4$.

The basic criterion we shall employ in selecting grids is to maximize the expected quality of the super resolution result (i.e., the super resolution mosaic) at the post-processing stage. In practice, this is achieved by choosing grids $S_t$ such that each frame provides complementary pixel information for the super resolution process. The grid selection process proceeds by replicating part of the super resolution mosaic creation process. In one embodiment, the criterion used to select grids is the super resolution filling factor.

Turning to FIG. 9, steps relating to the selection of sampling grids are indicated generally by the reference numeral 900. In particular, FIG. 9A shows a step 910 where a sampling grid is chosen for a reference frame. FIG. 9B shows a step 920 where an unfilled super resolution frame ($H_{SR}$) of the same size as $H_1$ is initialized (and where I is the identity transform since we presume that there is no motion between $H_{SR}$ and $H_1$). FIG. 9C shows a step 930 where a filling factor is chosen for each candidate grid. FIG. 9D shows a step 940 where the previous steps are repeated for each frame $H_t$ to select the corresponding $S_t$.

The preceding method 900 for sampling grid selection may also be further described as follows (presuming a set of four frames, $H_1$ being the reference frame):

1. Compute the motion transformations $\Theta_{t1}$ between each frame $H_t$ to the reference frame ($H_1$).
2. Choose the sampling grid for the reference frame as $S_1 = g_1$.
3. Initialize an "unfilled" super resolution frame ($H_{SR}$) in the coordinates of the reference frame (i.e. assuming there is no motion between $H_{SR}$ and $H_1$). "Fill" the pixels in $H_{SR}$ corresponding to pixel positions given by grid $S_1$.
4. For each remaining HR frame $H_t$ ($t \neq 1$), compute the filling factor of each possible candidate grid in G. The filling factor of a candidate grid $g_i$ is defined as the number of previously unfilled pixels in $H_{SR}$ that are filled when $g_i$ is selected for $H_t$. The grid $g_i^*$ that results in the highest filling factor is then selected (i.e., $S_t = g_i^*$) and the corresponding pixels in $H_t$ are filled (taking into account the motion transformation $\Theta_{t1}$).
5. If all the frames $H_t$ in the set have been processed, terminate. Otherwise, go back to step 4.

In step 4, the filling factor of a candidate grid $g_i$ is computed as follows. First consider each grid $g_i \in G$ in turn for $H_t$, transform (move) the pixels given by $g_i$ to $H_{SR}$ using $\Theta_{t1}$ (rounding to the nearest pixel position in $H_{SR}$), and compute the filling factor by recording how many previously unfilled pixel positions in $H_{SR}$ are filled by the transformed pixels. Thereafter, the grid $g_i^*$ that results in the highest filling factor is selected (i.e. $S_t = g_i^*$). Note that the selected grids $S_t$ and the resulting super resolution quality may depend on the order in which the frames $H_t$ are processed. One ordering strategy is to consider frames in increasing order of their temporal distance from the reference frame. For example, if $H_2$ is the reference frame, then the other frames are processed in the following order: $H_1$; $H_3$; and $H_4$.

Variations of the filling factor measure or entirely different metrics involving super resolution quality may be used as criteria for grid selection. For example, instead of declaring each pixel in $H_{SR}$ as being filled or unfilled, we could keep track of the number of grid pixels mapped to each pixel therein. Thereafter, the filling factor could be redefined as a measure of incremental information wherein grids that have greater incremental contribution to $H_{SR}$ score higher. Another criterion for grid selection could involve completely replicating the super resolution process (using the previously selected grids $S_1$-$S_{t-1}$ and the current candidate grids for $S_t$) and choose a grid $S_t$ that results in the highest SR quality, e.g., based on PSNR with respect to the reference frame.

Down-Sampling High Resolution to Low Resolution

After the grid selection process, each high resolution frame $H_t$ has a corresponding sampling grid $S_t$. Depending on the nature of $S_t$, $H_t$ is down-sampled to the low resolution frame $L_t$ as follows:

In the case that $S_t$ is a rectangular grid (FIG. 7B), i.e., $S_t = g_i$ (i=1, 2, 3, 4), $L_t$ is formed by taking the pixels from $S_t$ and packing them horizontally and vertically as illustrated in FIGS. 7C-7F.

In the case that $S_t$ is a horizontally staggered grid (FIG. 8B), i.e., $S_t = g_i$ (i=5, 6, 7, 8), each row with sampled pixels is shifted to the left so that the first sampled pixels in all these rows align vertically. Thereafter, $L_t$ is formed by packing the pixels as described above.

In the case that $S_t$ is a vertically staggered grid (FIG. 8D), i.e., $S_t = g_i$ (i=9, 10, 11, 12), each column with sampled pixels is shifted upward so that the first sampled pixels in all these columns align horizontally. Thereafter, $L_t$ is formed by packing the pixels as described above.

For uniform sampling grids with various other structures, a suitable packing strategy may be devised so as to form a rectangular low resolution frame using the pixels sampled from the high resolution frame.

The low resolution frames thus created are then compressed using a video encoder. The side information including the estimated motion transformation parameters ($\theta_{21}$, $\theta_{31}$, $\theta_{41}$) and the selected sampling grids ($S_1$, $S_2$, $S_3$, $S_4$) are transmitted as metadata. Note here that it is sufficient to send the sampling grid indices instead of the grids themselves (i.e., if $S_t = g_i$, send i). The grids are then known from a lookup table at the post-processing stage.

Post-Processing Stage of Sampling-Based SR

Figure 10:
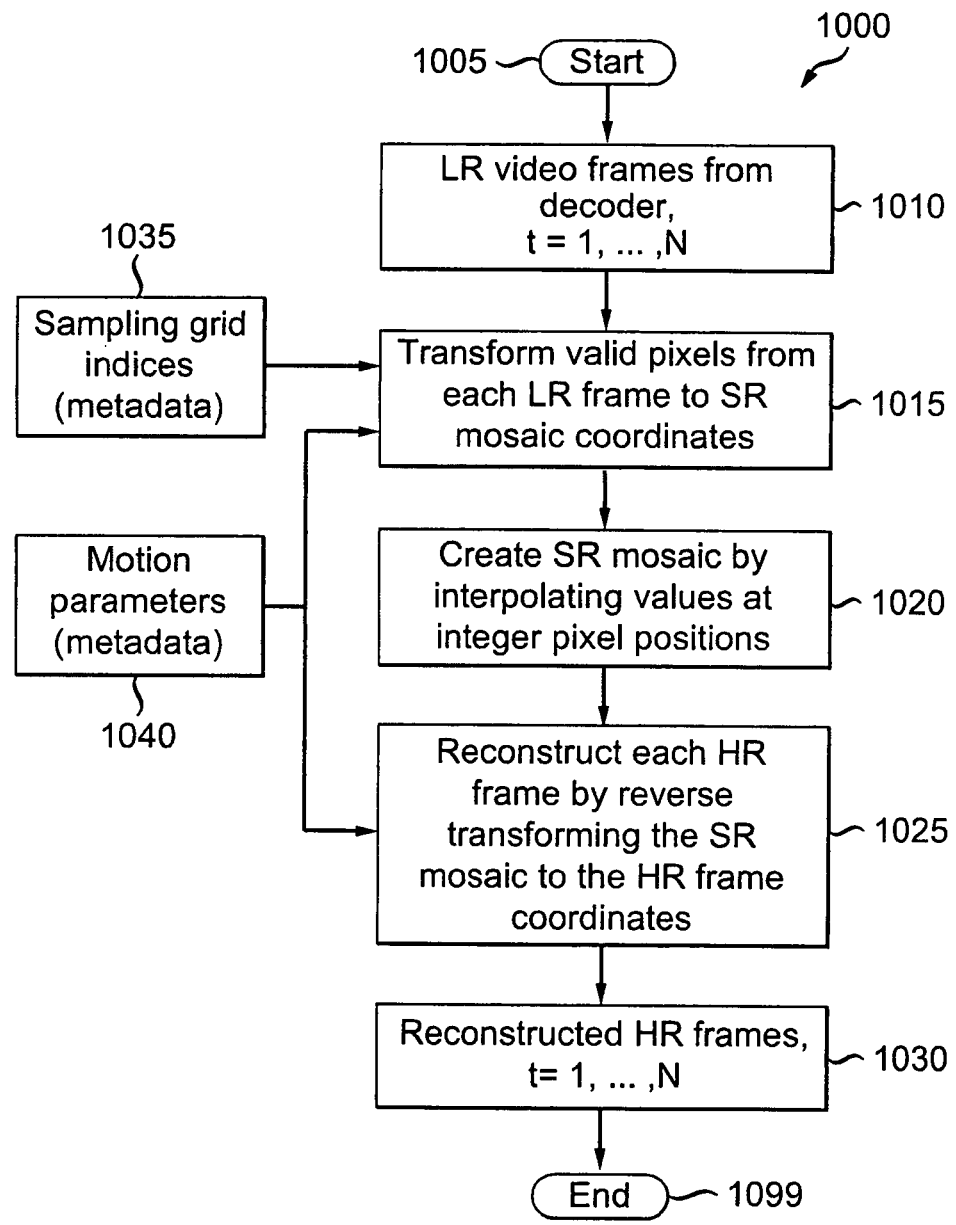
FIG. 10 is a flow diagram showing an exemplary method relating to a post-processing stage of a sampling-based super resolution method, in accordance with an embodiment of the present principles.

At the post-processing stage, we use the decoded low resolution frames and the metadata to reconstruct the corresponding high resolution frames, a process known as super resolution (SR). Turning to FIG. 10, an exemplary method relating to a post-processing stage of a sampling-based super resolution method is indicated generally by the reference numeral 1000. The method 1000 includes a start block 1005 that passes control to a function block 1010. The function block 1010 input low resolution video frames from a decoder, t=1, ..., N, and passes control to a function block 1015. The function block 1015 transforms valid pixels from each low resolution frame to super resolution mosaic coordinates, and passes control to a function block 1020. The function block 1020 creates a super resolution mosaic by interpolating values at integer pixel positions, and passes control to a function block 1025. The function block 1025 reconstructs each high resolution frame by reverse transforming the super resolution mosaic to the high resolution frame coordinates, and passes control to a function block 1030. The function block 1030 reconstructs the high resolution frames, t=1, ..., N, and passes control to an end block 1099. A function block 1035 provides sampling grid indices to the function block 1015 for use thereby. A function block 1040 provides motion parameters (metadata) to the function blocks 1015 and 1025 for use thereby.

Suppose that we have a set of decoded LR frames $\hat{L}_t$ corresponding to the set of high resolution frames $H_t$ (t=1, 2, 3, 4) at the pre-processing stage (FIGS. 4A-4D). The metadata includes the motion parameters and the sampling grid indices. The following are the steps (see FIG. 5A-5D) involved in reconstructing the high resolution frames $\hat{H}_t$ using the decoded low resolution frames and the side information:

1. Creation of super resolution mosaic from low resolution frames: In this step, a high-resolution "SR" mosaic image $\hat{H}_{SR}$ is created using the pixels from the set of decoded low resolution frames and the side-information. This will serve as a reference image from which the HR frames will be reconstructed. In further detail, a portion of each reconstructed HR frame will come from the SR mosaic and the remaining portions will be spatially interpolated from the corresponding LR frame pixels.

2. Reconstruction of high resolution frames: Each high resolution frame $\hat{H}_t$ in the set is reconstructed using the super resolution mosaic image $\hat{H}_{SR}$ and the low resolution frame $\hat{L}_t$ using the side-information to guide the process.

These steps are further explained herein below.

Creation of Super Resolution Mosaic from Low Resolution Frames

In this step, a high-resolution super resolution mosaic image $\hat{H}_{SR}$ is constructed using the set of decoded low resolution frames $\hat{L}_t$ (t=1, 2, 3, 4) and the associated metadata, which comprises the grids $S_t$ used to create the low resolution frames $L_t$ and the transformations $\Theta_{t1}$ from each frame to the reference frame in the set (Frame at t=1 in FIG. 5A). $\hat{H}_{SR}$ is assumed to be in the same coordinates as the reference frame, i.e., there is no motion between $\hat{H}_{SR}$ and $\hat{H}_1$. The following are the steps to construct $\hat{H}_{SR}$:

1. For the time being, consider $\hat{H}_{SR}$ to be a continuous 2-D pixel space wherein non-integer pixel positions may exist, e.g., $\hat{H}_{SR}$ (1.44, 2.35)=128.

2. Fill in the pixel positions in $\hat{H}_{SR}$ given by the transformed grid positions $\Theta_{t1}(S_t)$ with the corresponding pixel values in the decoded low resolution frame $\hat{L}_t$. Do this for each decoded low resolution frame in the set (t=1, 2, 3, 4). Note that $\Theta_{11}$=I (identity transformation) since there is no motion between $\hat{H}_{SR}$ and $\hat{H}_1$.

3. Finally an image $\hat{H}_{SR}$ is constructed by interpolating the pixel values at all integer pixel positions where sufficient (e.g., as determined using a threshold) data is available, from the surrounding pixel values at each of those positions. A variety of (non-uniform) spatial interpolation methods are available for this operation. These methods take a set of pixel positions and corresponding values, and output interpolated values at any number of other positions. The grid data function of MATLAB can be used to carry out this interpolation.

The result of the above steps is the super resolution mosaic image $\hat{H}_{SR}$. In addition, a validity map may be computed to determine which pixels of $\hat{H}_{SR}$ include reliable information so that only these pixels are used in the reconstruction of high resolution frames. A measure of validity may be computed at each pixel of the mosaic image based on the samples (e.g., the number or density of the samples) in a neighborhood around the pixel. Thereafter, a pixel in the mosaic is used in the reconstruction process only if its validity value is high enough (e.g., above a given threshold).

Reconstruction of High Resolution Frames

Now each high resolution frame $\hat{H}_t$ (t=1, 2, 3, 4) is reconstructed as follows:

1. For the time being, consider $\hat{H}_t$ to be a continuous 2-D pixel space wherein non-integer pixel positions may exist. Fill in the pixel positions in $\hat{H}_t$ given by the grid $S_t$ with the corresponding pixel values in $\hat{L}_t$.

2. Transform the pixel positions in $\hat{H}_{SR}$ using the motion transformation $\Theta_{1t}$. Note that $\Theta_{1t}$ is the inverse transformation of $\Theta_{t1}$. If an integer pixel position x in $\hat{H}_{SR}$ maps to a position y in the $\hat{H}_t$ space after transformation [i.e., y=$\Theta_{1t}$(x)], then fill in y with the corresponding value in $\hat{H}_{SR}$, i.e., $\hat{H}_t(y)=\hat{H}_{SR}(x)$.

3. Finally, the high resolution frame $\hat{H}_t$ is reconstructed by interpolating the pixel values at all integer pixel positions in the frame from the surrounding pixel values at each of those positions. This is handled using a spatial interpolation method as described in the previous section (step 3). Pixels outside the frame boundaries are not determined.

Handling Foreground Objects

Figure 11A:
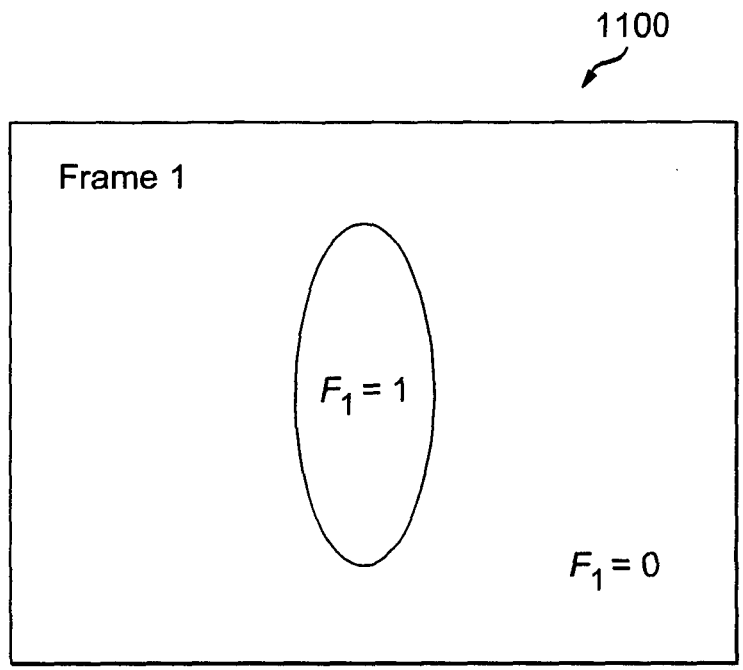
FIGS. 11A-11B are diagrams showing the motion of a foreground object between two frames, in accordance with an embodiment of the present principles.
Figure 11B:
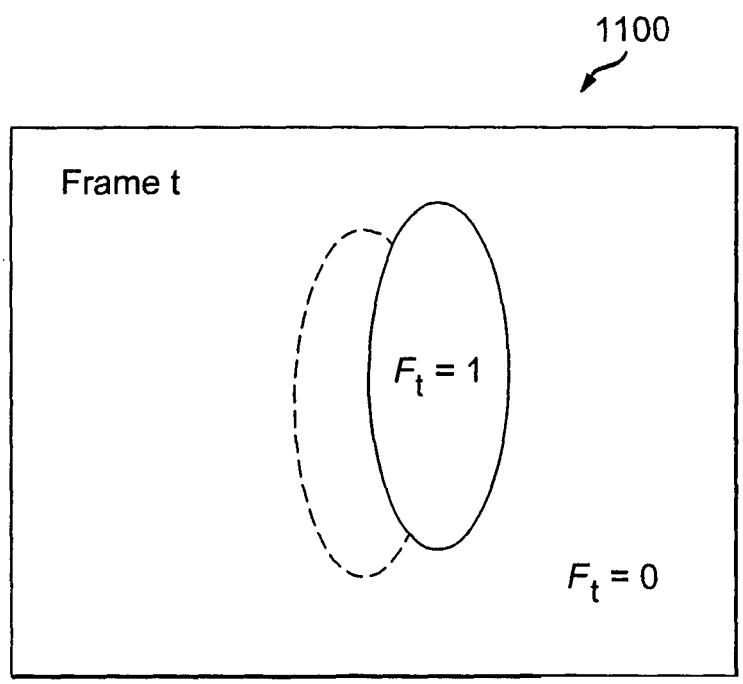

So far, we have assumed that the motion between frames is fully described by a global motion model, i.e., all pixels adhere to this motion model. We now present a strategy to handle foreground objects. Foreground objects are defined as objects (or regions) that do not follow the global motion between frames. In other words, these objects have motions that are different from the global motion between frames. Turning to FIGS. 11A-B, the motion of a foreground object between two frames (Frame 1 and Frame t) is indicated generally by the reference numeral 1100. To avoid artifacts in the sampling-based super resolution process, it is important to locate foreground objects and use this knowledge during certain steps in the procedure. The foreground may be represented by a binary mask $F_t$, where $F_t$=1 indicates the foreground pixels, and $F_t$=0 indicates the background pixels.

Suppose we have obtained a binary mask $F_t$ (as shown in FIG. 11B) for each frame indicating the foreground pixels therein. Let $FG_t$ be the set of all pixels with $F_t$=1 and $\overline{FG_t}$ be the set of all pixels with $F_t$=0. Then, this information may be used as follows:

In the sampling grid selection process, the foreground regions may be excluded while determining the sampling grids for sampling $H_t$ to create $L_t$. In steps 3 and 4, we could avoid mapping pixels in $FG_t$ from $H_t$ to $H_{SR}$. Thus, the filling factor (or other measure) is computed based on background pixels alone. Furthermore, during sampling grid estimation, sufficiently flat regions in $H_t$ could be considered to be part of $FG_t$. This could improve super resolution by giving higher importance to regions with details during the grid selection process. Flat regions could be determined based on measures such as spatial variance.

Prior to down-sampling a high resolution frame to low resolution, an anti-aliasing filter may be applied to foreground regions in the frame. Since foreground regions are not super-resolved in the current embodiment, the anti-aliasing operation may help in obtaining a better spatial interpolation result for these regions at the post-processing stage.

Consider the super resolution mosaic creation process. In step 2, we may avoid transforming foreground pixels ($FG_t$) of $\hat{L}_t$ to $\hat{H}_{SR}$.

In step 2 of the high resolution frame reconstruction process, we could discard any transformed pixels from $\hat{H}_{SR}$ to $\hat{H}_t$ falling inside regions defined by $FG_t$. Furthermore, in step 1, we could (optionally) choose not to use pixels from $S_t$ that map inside regions defined by $\overline{FG_t}$.

In the previous two alterations, sufficiently (as determined, e.g., using a threshold) flat regions in $\hat{L}_t$ or $\hat{H}_t$ could be considered to be part of $FG_t$. In this case, spatial interpolation will be used to up-sample these regions.

Thus far, the foreground regions in the reconstructed high resolution frame $\hat{H}_t$ are just spatially interpolated from the pixels in the corresponding decoded low resolution frame $\hat{L}_t$. Information from other low resolution frames is not explicitly exploited to super-resolve these regions. However, it may be possible to send some additional information such as block motion vectors (to exploit sub-pixel motion between frames) or high resolution patches as metadata in order to super-resolve the foreground regions in part or in full at the receiver side.

In addition to the above, other criteria using the foreground information may be used to improve the quality of the result.

Foreground Mask Estimation

It is a difficult problem to extract a clean and reliable foreground mask from frames with independently moving regions. Errors in global motion estimation along with the noise in the pixel values complicate the process. Furthermore, there is also the issue of compactly representing and transmitting the foreground information as metadata to the decoder.

One method for extracting foreground masks $F_t$ for each high resolution frame $\hat{H}_t$ is now described. This takes place in the pre-processing stage where the high resolution frames are available. The following are the steps in the process.

1. For frame $H_1$, the mask $F_1$ is filled with zeros. In other words, all pixels are considered as background.
2. To extract $F_t$, the frame $\hat{H}_t$ is compared with $H_{1t}=\Theta_{1t}(H_1)$, i.e., $H_1$ is transformed to the coordinates of $\hat{H}_t$. A normalized correlation metric $N_{t1}(x)$ is computed between each pixel x in $\hat{H}_t$ and the corresponding pixel in $H_{1t}$ considering a small neighborhood around the pixels. If there is no corresponding pixel in $H_{1t}$, (i.e., $\Theta_{t1}(x)$ lies outside the boundaries of $H_1$), then $F_t(x)$ is set to 1. Otherwise, if $N_{t1}(x)>T$, where T is a chosen threshold, then $F_t(x)=0$. Otherwise, $F_t(x)=1$.

Other methods including variations of the above may be used instead.

If the masks are computed at the pre-processing stage, they have to be transmitted as side-information to the receiver. It may not be necessary to transmit a high resolution version of the foreground masks. The masks may be down-sampled to low resolution using the same strategy as used to create the low resolution frames $L_t$ from $\hat{H}_t$, and then up-sampled at the post-processing stage. The masks may also be compressed (e.g., using ZIP, the MPEG-4 AVC Standard, and/or any other data compression scheme) prior to transmission. Alternatively, transmitting the masks may be entirely avoided by computing them at the receiver side using the decoded low resolution frames and the metadata. However, it is a difficult problem to compute a reliable mask at the receiver.

We note the following possible variations that may be employed in one or more embodiments of the present principles and still remain within the scope of the present invention, as would be apparent to one skilled in the art.

1. Although the method is described for a set of four frames, the number of frames N in the set has no upper bound. In practice, N should be at least 4. The size of the set could be determined based on the down-sampling factor and the amount of motion between frames.
2. A sequence with K>N frames can be broken down into a number of sets of N frames each. Each set could be treated using the proposed method.
3. The reference frame need not always be the first frame in the set. It may be advantageous using a frame near the (temporal) center of the set in order to minimize the amount of motion between reference and non-reference frames.
4. While reconstructing a set of frames, information from other sets of frames may be used. For example, the reconstructed high resolution reference frame from the previous set may be used to reconstruct a non-reference frame in the current set. For this purpose, motion information between sets of frames may be determined and transmitted as metadata. Also, information from frames outside the current set may be used during the super resolution mosaic creation process.
5. The treatment herein is valid for both grayscale (single component) and color (multi-component) frames. One or more of the pre- and post-processing steps (e.g., sampling grid selection) may be independently carried out for each color component or by jointly considering all of them. For example, a different sampling grid may be determined for each color component.
6. Multiple sampling grids may be estimated for different regions of a single frame. For example, a frame may be divided into four rectangular quarters, and a sampling grid selected for each one. In this case, steps 2, 3 and 4 in the section above entitled "Sampling grid selection" are carried out on a per-quarter basis instead of a per-frame basis. All the subsequent processes (down-sampling, post-processing) are modified accordingly to use different sampling grids for different regions of a frame.
7. Different global motion transformations may be estimated for different regions of a single frame. For example, in the aforementioned section entitled "Motion estimation", a frame may be divided into four rectangular quarters and a different transformation may be estimated between each one and the reference frame in the set. All subsequent processes will use the corresponding transformation for each region in the frame.
8. In the aforementioned section entitled "Motion estimation", instead of estimating the transformation from each frame in the set to the reference frame, it is possible to estimate the transformation from each frame to the next (or vice versa) and combine one or more of these to derive the required transformations.
9. In the foreground masks (in the aforementioned section entitled "Foreground mask estimation"), a band of border pixels may be considered as foreground, e.g., for handling fixed black borders. As mentioned earlier, it is also possible to consider sufficiently flat regions as foreground.

A description will now be given of some of the many attendant advantages/features of the present invention, some of which have been mentioned above. For example, one advantage/feature is an apparatus having a down-sampler and metadata generator and at least one encoder. The down-sampler and metadata generator is for receiving high resolution pictures and generating low resolution pictures and metadata there from. The metadata is for guiding post-decoding post-processing of the low resolution pictures and the metadata. The at least one encoder (152) is for encoding the low resolution pictures and the metadata.

Another advantage/feature is the apparatus having the down-sampler and metadata generator and the at least one encoder as described above, wherein the metadata includes motion transformation information and sampling grid information.

Yet another advantage/feature is the apparatus having the down-sampler and metadata generator and the at least one encoder wherein the metadata includes motion transformation information and sampling grid information as described above, wherein the motion transformation information comprises global motion transformation information relating to global motion between two or more of the high resolution pictures.

Still another advantage/feature is the apparatus having the down-sampler and metadata generator and the at least one encoder wherein the metadata includes motion transformation information and sampling grid information as described above, wherein the sampling grid information comprises sampling grid indices for indicating each respective one of a plurality of down-sampling grids used to generate the low resolution pictures from the high resolution pictures by down-sampling.

A further advantage/feature is the apparatus having the down-sampler and metadata generator and the at least one encoder as described above, wherein the high resolution pictures includes at least one reference picture and one or more non-reference pictures, and the down-sampler and metadata generator generates the low resolution pictures by estimating motion from a reference picture to each of the one or more non-reference pictures, selecting one or more down-sampling grids from a plurality of candidate down-sampling grids for use in down-sampling the high resolution pictures based on the motion information, and down-sampling the high resolution pictures using the one or more down-sampling grids.

Moreover, another advantage/feature is the apparatus having the down-sampler and metadata generator and the at least one encoder wherein the high resolution pictures includes at least one reference picture and one or more non-reference pictures, and the down-sampler and metadata generator generates the low resolution pictures by estimating motion from a reference picture to each of the one or more non-reference pictures, selecting one or more down-sampling grids from a plurality of candidate down-sampling grids for use in down-sampling the high resolution pictures based on the motion information, and down-sampling the high resolution pictures using the one or more down-sampling grids as described above, wherein the one or more down-sampling grids are selected based on the motion information such that each of the high resolution pictures, when down-sampled using the one or more down-sampling grids, provide complementary pixel information for the post-decoding post-processing of the low resolution pictures.

Further, another advantage/feature is the apparatus having the down-sampler and metadata generator and the at least one encoder wherein the one or more down-sampling grids are selected based on the motion information such that each of the high resolution pictures, when down-sampled using the one or more down-sampling grids, provide complementary pixel information for the post-decoding post-processing of the low resolution pictures as described above, wherein the grids are further selected based upon a filling factor that indicates a number of previously unfilled pixels in a super resolution picture generated using a particular one of the one or more down-sampling grids, the super resolution picture corresponding to an output provided by the post-decoding post-processing of the low resolution pictures and the metadata.

Also, another advantage/feature is the apparatus having the down-sampler and metadata generator and the at least one encoder wherein the one or more down-sampling grids are selected based on the motion information such that each of the high resolution pictures, when down-sampled using the one or more down-sampling grids, provide complementary pixel information for the post-decoding post-processing of the low resolution pictures as described above, wherein the grids are further selected based upon a distortion measure.

Additionally, another advantage/feature is the apparatus having the down-sampler and metadata generator and the at least one encoder wherein the high resolution pictures includes at least one reference picture and one or more non-reference pictures, and the down-sampler and metadata generator generates the low resolution pictures by estimating motion from a reference picture to each of the one or more non-reference pictures, selecting one or more down-sampling grids from a plurality of candidate down-sampling grids for use in down-sampling the high resolution pictures based on the motion information, and down-sampling the high resolution pictures using the one or more down-sampling grids as described above, wherein different ones of the plurality of down-sampling grids are used to down-sample different portions of a particular one of at least one of the high resolution pictures.

Moreover, another advantage/feature is the apparatus having the down-sampler and metadata generator and the at least one encoder wherein the high resolution pictures includes at least one reference picture and one or more non-reference pictures, and the down-sampler and metadata generator generates the low resolution pictures by estimating motion from a reference picture to each of the one or more non-reference pictures, selecting one or more down-sampling grids from a plurality of candidate down-sampling grids for use in down-sampling the high resolution pictures based on the motion information, and down-sampling the high resolution pictures using the one or more down-sampling grids as described above, wherein a respective binary mask is constructed for each of the high resolution pictures, the binary mask indicating respective locations of foreground pixels in the high resolution pictures.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
a down-sampler and metadata generator for receiving high resolution pictures and generating low resolution pictures and metadata there from, the metadata for guiding post-decoding post-processing of the low resolution pictures and the metadata; and
at least one encoder for encoding the low resolution pictures and the metadata,
wherein the metadata comprises motion transformation information relating to motion
between two or more of the high resolution pictures and sampling grid indices, and
wherein the high resolution pictures include at least one reference picture and one or more non-reference pictures, and the down-sampler and metadata generator generate the low resolution pictures by estimating motion from a reference picture to each of the one or more non-reference pictures, selecting one or more down-sampling grids from a plurality of candidate down-sampling grids for use in down-sampling the high resolution pictures based on the motion information, and down-sampling the high resolution pictures using the one or more down-sampling grids.

2. The apparatus of claim 1, wherein the motion transformation information comprises global motion transformation information relating to global motion between two or more of the high resolution pictures.

3. The apparatus of claim 1, wherein the sampling grid indices indicate each respective one of a plurality of down-sampling grids used to generate the low resolution pictures from the high resolution pictures by down-sampling.

4. The apparatus of claim 1, wherein the one or more down-sampling grids are selected based on the motion information such that each of the high resolution pictures, when down-sampled using the one or more down-sampling grids, provide complementary pixel information for the post-decoding post-processing of the low resolution pictures.

5. The apparatus of claim 4, wherein the grids are further selected based upon a filling factor that indicates a number of previously unfilled pixels in a super resolution picture generated using a particular one of the one or more down-sampling grids, the super resolution picture corresponding to an output provided by the post-decoding post-processing of the low resolution pictures and the metadata.

6. The apparatus of claim 4, wherein the grids are further selected based upon a distortion measure.

7. The apparatus of claim 1, wherein different ones of the plurality of down-sampling grids are used to down-sample different portions of a particular one of at least one of the high resolution pictures.

8. The apparatus of claim 1, wherein a respective binary mask is constructed for each of the high resolution pictures, the binary mask indicating respective locations of foreground pixels in the high resolution pictures.

9. A method, comprising:
receiving high resolution pictures and generating low resolution pictures and metadata there from, the metadata for guiding post-decoding post-processing of the low resolution pictures and the metadata; and
encoding the low resolution pictures and the metadata using at least one encoder,
wherein the metadata comprises motion transformation information relating to motion
between two or more of the high resolution pictures and sampling grid indices, and
wherein the high resolution pictures include at least one reference picture and one or more non-reference pictures, and the down-sampler and metadata generator generate the low resolution pictures by estimating motion from a reference picture to each of the one or more non-reference pictures, selecting one or more down-sampling grids from a plurality of candidate down-sampling grids for use in down-sampling the high resolution pictures based on the motion information, and down-sampling the high resolution pictures using the one or more down-sampling grids.

10. The method of claim 9, wherein the motion transformation information comprises global motion transformation information relating to global motion between two or more of the high resolution pictures.

11. The method of claim 9, wherein the sampling grid indices indicate each respective one of a plurality of down-sampling grids used to generate the low resolution pictures from the high resolution pictures by down-sampling.

12. The method of claim 9, wherein the one or more down-sampling grids are selected based on the motion information such that each of the high resolution pictures, when down-sampled using the one or more down-sampling grids, provide complementary pixel information for the post-decoding post-processing of the low resolution pictures.

13. The method of claim 12, wherein the grids are further selected based upon a filling factor that indicates a number of previously unfilled pixels in a super resolution picture generated using a particular one of the one or more down-sampling grids, the super resolution picture corresponding to an output provided by the post-decoding post-processing of the low resolution pictures and the metadata.

14. The method of claim 12, wherein the grids are further selected based upon a distortion measure.

15. The method of claim 9, wherein different ones of the plurality of down-sampling grids are used to down-sample different portions of a particular one of at least one of the high resolution pictures.

16. The method of claim 9, wherein a respective binary mask is constructed for each of the high resolution pictures, the binary mask indicating respective locations of foreground pixels in the high resolution pictures.

17. An apparatus, comprising:
a decoder for receiving a bitstream and decoding low resolution pictures and metadata there from; and
a super resolution post-processor for reconstructing high resolution pictures respectively corresponding to the low resolution pictures using the low resolution pictures and the metadata,
wherein the metadata comprises motion transformation information and sampling grid indices, and wherein the super-resolution post-processor creates a high resolution mosaic from the metadata and the low resolution pictures by interpolating pixel values at pixel positions in the low resolution pictures, and reconstructs the high resolution pictures using the low resolution pictures, the metadata, and the high resolution mosaic.

18. The apparatus of claim 17, wherein the motion transformation information comprises global motion transformation information relating to global motion between two or more of the high resolution pictures.

19. The apparatus of claim 17, wherein the sampling grid indices indicate each respective one of a plurality of down-sampling grids used to generate the low resolution pictures from the high resolution pictures by down-sampling.

20. The apparatus of claim 17, wherein the high resolution mosaic is created by interpolating pixel values at pixel positions in the high resolution mosaic from pixel values of surrounding co-located pixels in the low resolution pictures.

21. The apparatus of claim 17, wherein said super-resolution post-processor generates a validity map that includes a measure of validity for each of pixels in the high resolution mosaic.

22. The apparatus of claim 21, wherein the measure of validity, for a given one of the pixels in the high resolution mosaic, is computed based on samples in a neighborhood around the given one of the pixels, and the given one of the pixels is designated as acceptable for use in reconstructing the high resolution pictures only if the measure of validity computed for the given one of the pixels is above a threshold value.

23. The apparatus of claim 17, wherein a given one of the high resolution pictures is reconstructed by interpolating pixel values at pixel positions in the given one of the high resolution pictures from pixels values of at least one of surrounding co-located pixels in a corresponding one of the low resolution pictures, surrounding co-located pixels in the high resolution mosaic, and surrounding co-located pixels in at least another one of the low resolution pictures, wherein the interpolating from the surrounding co-located pixels in the high resolution mosaic involves a motion transformation of pixels between the given one of the high resolution pictures and the high resolution mosaic, and wherein the interpolating from the surrounding co-located pixels in the at least other one of the low resolution pictures involves the motion transformation of pixels between the given one of the high resolution pictures and the at least other one of the low resolution pictures.

24. The apparatus of claim 17, wherein foreground pixels of a particular one of the high resolution pictures are reconstructed by interpolating from surrounding co-located pixels in the low resolution pictures.

25. A method, comprising:
receiving a bitstream and decoding low resolution pictures and metadata there from using a decoder; and
reconstructing high resolution pictures respectively corresponding to the low resolution pictures using the low resolution pictures and the metadata,
wherein the metadata comprises motion transformation information and sampling grid indices, and
wherein the super-resolution post-processor creates a high resolution mosaic from the metadata and the low resolution pictures by interpolating pixel values at pixel positions in the low resolution pictures, and reconstructs the high resolution pictures using the low resolution pictures, the metadata, and the high resolution mosaic.

26. The method of claim 25, wherein the motion transformation information comprises global motion transformation information relating to global motion between two or more of the high resolution pictures.

27. The method of claim 25, wherein the sampling grid indices indicate each respective one of a plurality of down-sampling grids used to generate the low resolution pictures from the high resolution pictures by down-sampling.

28. The method of claim 25, wherein the high resolution mosaic is created by interpolating pixel values at pixel positions in the high resolution mosaic from pixel values of surrounding co-located pixels in the low resolution pictures.

29. The method of claim 25, further comprising generating a validity map that includes a measure of validity for each of pixels in the high resolution mosaic.

30. The method of claim 29, wherein the measure of validity, for a given one of the pixels in the high resolution mosaic, is computed based on samples in a neighborhood around the given one of the pixels, and the given one of the pixels is designated as acceptable for use in reconstructing the high resolution pictures only if the measure of validity computed for the given one of the pixels is above a threshold value.

31. The method of claim 25, wherein a given one of the high resolution pictures is reconstructed by interpolating pixel values at pixel positions in the given one of the high resolution pictures from pixels values of at least one of surrounding co-located pixels in a corresponding one of the low resolution pictures, surrounding co-located pixels in the high resolution mosaic, and surrounding co-located pixels in at least another one of the low resolution pictures, wherein the interpolating from the surrounding co-located pixels in the high resolution mosaic involves a motion transformation of pixels between the given one of the high resolution pictures and the high resolution mosaic, and wherein the interpolating from the surrounding co-located pixels in the at least other one of the low resolution pictures involves the motion transformation of pixels between the given one of the high resolution pictures and the at least other one of the low resolution pictures.

32. The apparatus of claim 25, wherein foreground pixels of a particular one of the high resolution pictures are reconstructed by interpolating from surrounding co-located pixels in the low resolution pictures.

33. A non-transitory computer readable storage media having video signal data encoded thereupon, comprising:
encoded low resolution pictures and metadata generated from high resolution pictures, the metadata for guiding post-decoding post-processing of the low resolution pictures and the metadata,
wherein the metadata comprises motion transformation information and sampling grid indices, and
wherein super-resolution post-processing creates a high resolution mosaic from the metadata and the low resolution pictures by interpolating pixel values at pixel positions in the low resolution pictures, and reconstructs the high resolution pictures using the low resolution pictures, the metadata, and the high resolution mosaic.

* * * * *